(12) United States Patent
Yeo et al.

(10) Patent No.: US 12,498,765 B2
(45) Date of Patent: Dec. 16, 2025

(54) METHOD FOR DISPLAYING PREVIEW IMAGE AND ELECTRONIC DEVICE SUPPORTING THE SAME

(71) Applicant: Samsung Electronics Co., Ltd., Gyeonggi-do (KR)

(72) Inventors: Moonki Yeo, Gyeonggi-do (KR); Miyoung Kim, Gyeonggi-do (KR); Suyoun Kim, Gyeonggi-do (KR); Seungjoon Kim, Gyeonggi-do (KR); Seunghui Sunwoo, Gyeonggi-do (KR); Jongik Won, Gyeonggi-do (KR); Daekyu Lee, Gyeonggi-do (KR); Dongyup Lee, Gyeonggi-do (KR); Jiesoon Jeong, Gyeonggi-do (KR); Kwangrae Cho, Gyeonggi-do (KR); Sangheum Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 573 days.

(21) Appl. No.: 17/878,280

(22) Filed: Aug. 1, 2022

(65) Prior Publication Data
US 2023/0046377 A1 Feb. 16, 2023

Related U.S. Application Data

(63) Continuation of application No. PCT/KR2022/010747, filed on Jul. 22, 2022.

(30) Foreign Application Priority Data

Aug. 10, 2021 (KR) .................. 10-2021-0104980

(51) Int. Cl.
*G06F 1/16* (2006.01)
*G06F 3/14* (2006.01)

(52) U.S. Cl.
CPC .......... *G06F 1/1677* (2013.01); *G06F 1/1618* (2013.01); *G06F 1/1686* (2013.01)

(58) Field of Classification Search
CPC .... G06F 1/1677; G06F 1/1618; G06F 1/1686; G06F 1/16; G06F 1/1647; G06F 1/1652;
(Continued)

(56) References Cited

U.S. PATENT DOCUMENTS 8,448,071 B2  5/2013  Ahn et al.
10,015,407 B2  7/2018  Laroia
(Continued)

FOREIGN PATENT DOCUMENTS

CN  110022389 A  7/2019
CN  110602315 A  12/2019
(Continued)

OTHER PUBLICATIONS

Extended European Search Report dated Oct. 1, 2024.
(Continued)

*Primary Examiner* — Joseph E Dean, Jr.
(74) *Attorney, Agent, or Firm* — Cha & Reiter, LLC

(57) ABSTRACT

A foldable electronic device and method for the same are disclosed herein. The foldable electronic device includes at least one display, a sensor, at least one camera, a processor, at least one switch electrically connecting the at least one display, at least one camera and processor. The processor implements the method, including: detecting an operating state of the device via the sensor, and controlling the at least one switch to selectively connect the processor to one of the display and the at least one camera, based on the detected operating state.

19 Claims, 16 Drawing Sheets

(58) Field of Classification Search
CPC .... G06F 1/1681; G06F 1/3215; G06F 1/3265; G06F 1/3278; G06F 1/3287; G06F 3/14; G06F 1/1616; G06F 3/1431; H04N 23/00; H04N 23/60; H04N 23/90; H04N 23/57; H04N 23/63

See application file for complete search history.

(56) References Cited

U.S. PATENT DOCUMENTS

| | | |
|---|---|---|
| 10,531,007 B2 | 1/2020 | Laroia |
| 10,782,817 B2 | 9/2020 | Kang et al. |
| 10,922,513 B2 | 2/2021 | Chi et al. |
| 11,016,531 B2 | 5/2021 | Kim et al. |
| 11,064,124 B2 | 7/2021 | Laroia |
| 2020/0265799 A1* | 8/2020 | Choi ................... G06F 1/1652 |
| 2022/0191313 A1* | 6/2022 | Pan .................... G06F 1/1677 |
| 2022/0303476 A1 | 9/2022 | Jang et al. |
| 2024/0056675 A1 | 2/2024 | Jang et al. |

FOREIGN PATENT DOCUMENTS

| | | |
|---|---|---|
| CN | 112712065 A | 4/2021 |
| KR | 20-0342944 Y1 | 2/2004 |
| KR | 10-0675005 B1 | 1/2007 |
| KR | 10-1560718 B1 | 10/2015 |
| KR | 10-2018-0017507 A | 2/2018 |
| KR | 10-2018-0024678 A | 3/2018 |
| KR | 10-2020-0129584 A | 11/2020 |
| KR | 10-2021-0089377 A | 7/2021 |
| WO | 2021/006388 A1 | 1/2021 |

OTHER PUBLICATIONS

International Search Report dated Nov. 3, 2022.
Korean Office Action dated Jan. 17, 2025.
Korean Notice of Final Rejection dated Sep. 26, 2025.

* cited by examiner

|  | CONVENTIONAL TECHNOLOGY (ms) | THIS DISCLOSURE (ms) | DIFFERENCE |
|---|---|---|---|
| STARTING STATE CHANGE | 0 | 0 | 0 |
| TURNING OFF SECOND CAMERA | 21 | 18 | -3 |
| TURNING ON FIRST DISPLAY | 165 | 500 | +335 |
| TURNING ON FIRST CAMERA | 615 | 517 | -98 |
| DISPLAYING PREVIEW IMAGE | 1,086 | 866 | -220 |

FIG.12

METHOD FOR DISPLAYING PREVIEW IMAGE AND ELECTRONIC DEVICE SUPPORTING THE SAME

CROSS-REFERENCE TO RELATED APPLICATION(S)

This application is a continuation of, based on and claims priority under 35 U.S.C. § 120 to PCT International Application No. PCT/KR2022/010747, which was filed on Jul. 22, 2022, and claims priority to Korean Patent Application No. 10-2021-0104980, filed on Aug. 10, 2021, in the Korean Intellectual Property Office, the disclosures of which are incorporated by reference herein their entirety.

BACKGROUND

Technical Field

One or more embodiments of the instant disclosure generally related to foldable electronic devices, and more particular, to switched connections of displays and cameras to a processor within foldable electronic devices.

Description of Related Art

With the development of technology, there has been a proliferation of electronic device types, which may now include mobile communication terminals, personal digital assistants, electronic notebooks, smartphones, tablet personal computers, and wearable smart devices. These devices are continually being developed in terms of hardware and software, to better meet consumer demand.

Various device forms have been implemented to improve portability and increase display size. For example, an electronic device may be implemented as to include a folding mechanism for configuring a housing, and one or more flexible displays, so as to maintain portability while increasing an available display area.

Electronic devices also implement a variety of functions, including media playback of a variety of content, such as images, videos, streaming services, music, etc. Much of this functionality relies upon usage of a display. For example, images may be displayed on the display, such as streaming video or captured visual imagery (e.g., selfies).

SUMMARY

A foldable electronic device may provide a user with a preview image (e.g., selfie) in various forms. For example, the foldable electronic device may provide the preview image using a display and a camera, which may be positioned on a surface of the device typically viewable by the user, in a state (e.g., a folded state) in which at least part of housing is folded around a folding axis. In another example, the foldable electronic device may provide a preview image using a display and a camera, which may be positioned on a surface viewable by a user, in a state (e.g., an unfolded state) in which at least part of housing is unfolded around the folding axis.

The actual display and camera utilized to provide the preview image in the folded state may be different from a display and camera utilized to provide the preview image in the unfolded state. In particular, when unnecessary electrical connection structures for displays and/or cameras are present, which are not used in the folded state, the result may be that a preview image is displayed inefficiently.

Even though the foldable electronic device may not simultaneously utilize both of a main display (e.g., a first display) and a cover camera (e.g., a second camera) to provide a preview image, a connection between these two devices may be present, which may waste precious space within the device for mounting other components.

According to certain embodiments of the disclosure, it is possible to efficiently and adaptively display a preview image using a display and a camera, according to a type of an electronic device, using a switch structure electrically connecting a processor, the display, and the camera.

According to certain embodiments of the disclosure, a foldable electronic device is disclosed, including: at least one display, a camera, a processor, at least one switch configured to electrically connect the processor to one of the at least one display or the camera, a memory operatively connected to the at least one display, the camera, and the processor and storing instructions executable by the processor to cause the foldable electronic device to: control the at least one switch based on a signal indicating an operating state of the foldable electronic device.

According to certain embodiments of the disclosure, a method for a foldable electronic device is disclosed, including: obtaining, via a sensor, information indicating an operating state of the foldable electronic device, detecting, via at least one processor, the operating state of the foldable electronic device using the obtained information, and controlling, via the at least one processor, at least one switch to selectively connect a processor to one of at least one display and at least one camera, based on the detected operating state of the foldable electronic device.

According to an embodiment disclosed in the disclosure, it is possible to omit a particular structure (e.g., a connector pin unnecessarily connecting two components) in preference to inclusion of a switch that allows a processor to selectively connect to a display or camera. Accordingly, owing to the omission of the structure, more space may be allocated to mounting other components within housing.

According to an embodiment disclosed in the disclosure, the electronic device may provide a user with a preview image quickly and accurately by sequentially turning on or off a display and camera, based on a type of present operation.

Effects obtained in certain embodiments of the disclosure are not limited to the above-mentioned effects, and other effects that are not mentioned will be clearly understood by those skilled in the art, to which the disclosure belongs, from the following description.

BRIEF DESCRIPTION OF THE DRAWINGS

FIG. 12 is a table indicating an operating time of an electronic device, according to an embodiment.

In the description of the drawings, the same or similar reference numerals may be used for the same or similar components.

DETAILED DESCRIPTION

Hereinafter, various example embodiments of the disclosure will be described in greater detail with reference to the accompanying drawings. However, it should be understood that the disclosure is not limited to specific embodiments, but rather includes various modifications, equivalents and/or alternatives of the embodiments of the present disclosure.

Figure 1:
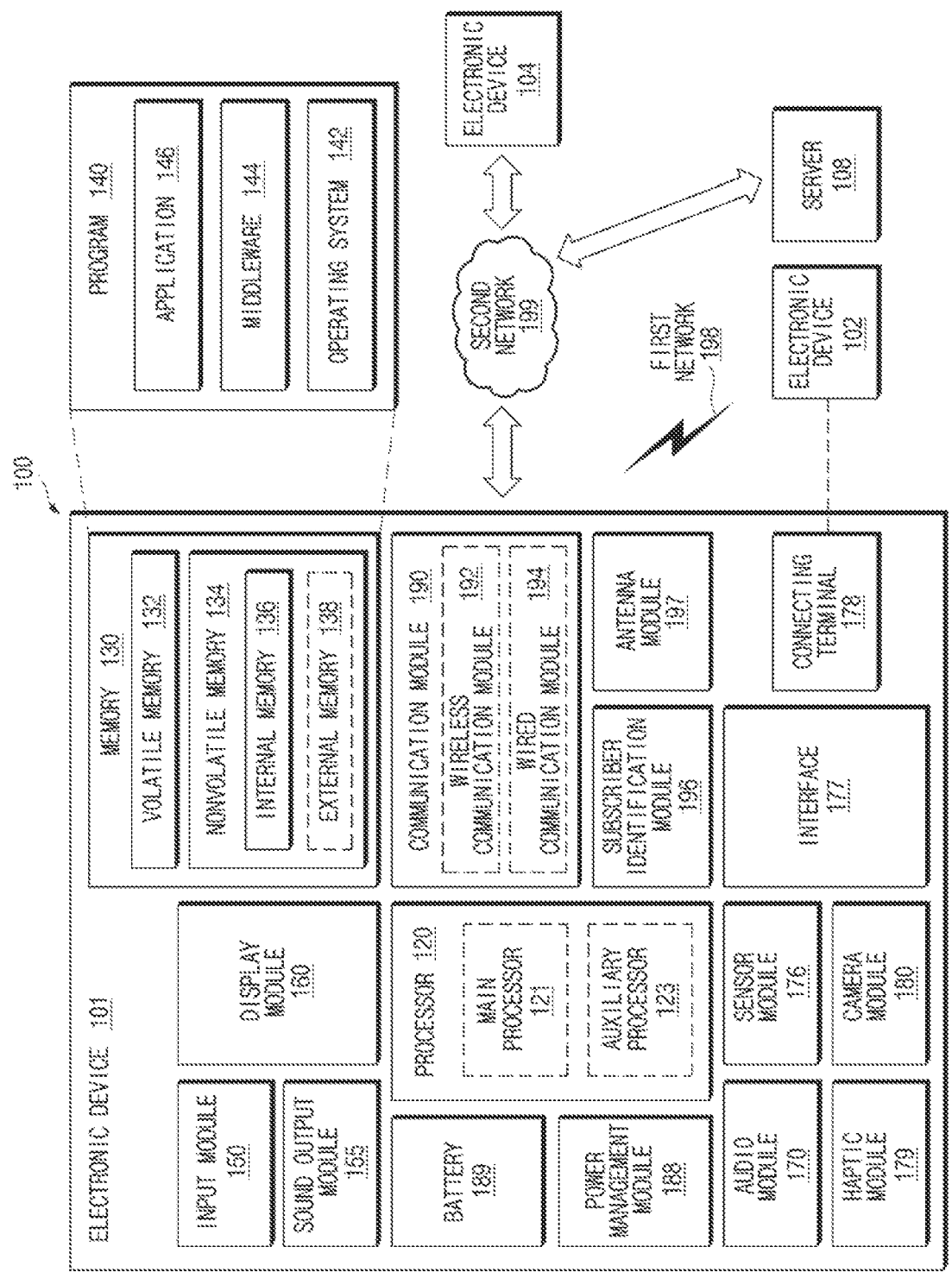
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
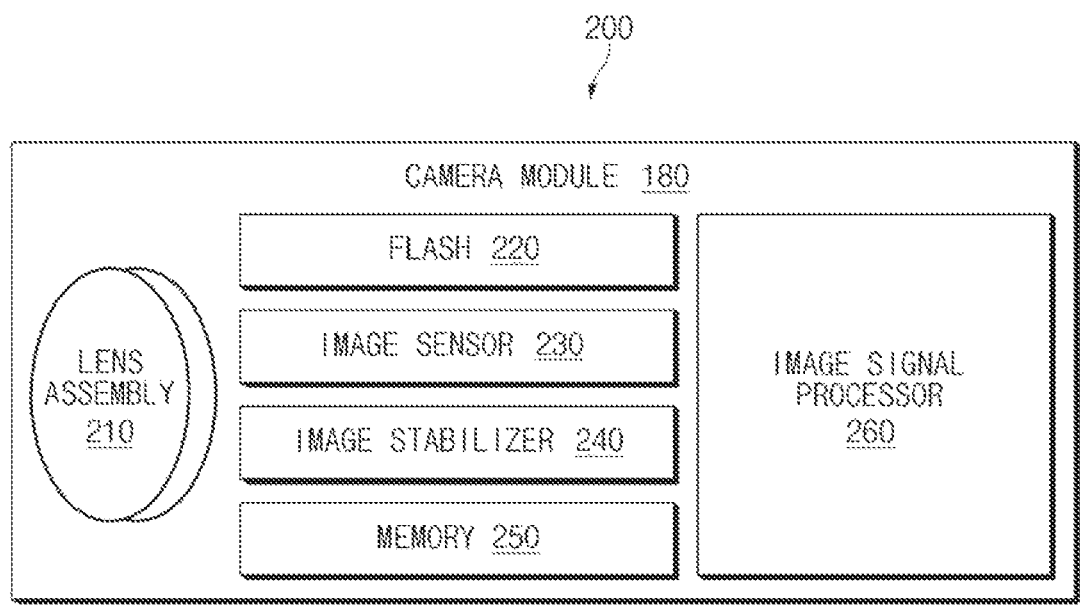
FIG. 2 is a block diagram illustrating the camera module according to certain embodiments.

FIG. 2 is a block diagram 200 illustrating the camera module 180 according to certain embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, autofocusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
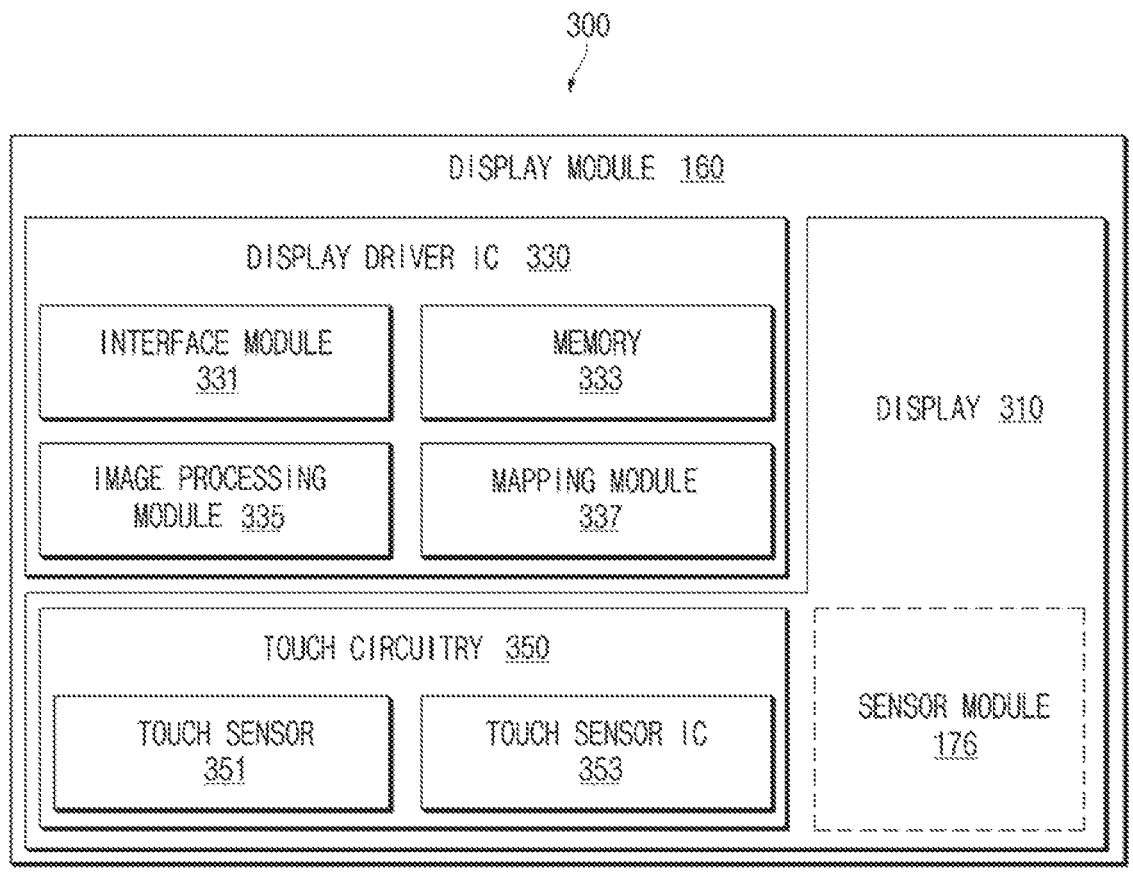
FIG. 3 is a block diagram illustrating the display module according to certain embodiments.

FIG. 3 is a block diagram 300 illustrating the display module 160 according to certain embodiments. Referring to FIG. 3, the display module 160 may include a display 310 and a display driver integrated circuit (DDI) 330 to control the display 310. The DDI 330 may include an interface module 331, memory 333 (e.g., buffer memory), an image processing module 335, or a mapping module 337. The DDI 330 may receive image information that contains image data or an image control signal corresponding to a command to control the image data from another component of the electronic device 101 via the interface module 331. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 330 may communicate, for example, with touch circuitry 350 or the sensor module 176 via the interface module 331. The DDI 330 may also store at least part of the received image information in the memory 333, for example, on a frame by frame basis. The image processing module 335 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 310. The mapping module 337 may generate a voltage value or a current value corresponding to the image data pre-processed or post-processed by the image processing module 335. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 310 may be driven, for example, based at least in part on the voltage value or the current value such that visual information (e.g., a text, an image, or an icon) corresponding to the image data may be displayed via the display 310.

According to an embodiment, the display module 160 may further include the touch circuitry 350. The touch circuitry 350 may include a touch sensor 351 and a touch sensor IC 353 to control the touch sensor 351. The touch sensor IC 353 may control the touch sensor 351 to sense a touch input or a hovering input with respect to a certain position on the display 310. To achieve this, for example, the touch sensor 351 may detect (e.g., measure) a change in a signal (e.g., a voltage, a quantity of light, a resistance, or a quantity of one or more electric charges) corresponding to the certain position on the display 310. The touch circuitry 350 may provide input information (e.g., a position, an area, a pressure, or a time) indicative of the touch input or the hovering input detected via the touch sensor 351 to the processor 120. According to an embodiment, at least part (e.g., the touch sensor IC 353) of the touch circuitry 350 may be formed as part of the display 310 or the DDI 330, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 310, the DDI 330, or the touch circuitry 350)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 310. As another example, when the sensor module 176 embedded in the display module 160 includes a pressure sensor, the pressure sensor may obtain pressure information corresponding to a touch input received via a partial or whole area of the display 310. According to an embodiment, the touch sensor 351 or the sensor module 176 may be disposed between pixels in a pixel layer of the display 310, or over or under the pixel layer.

Figure 4A:
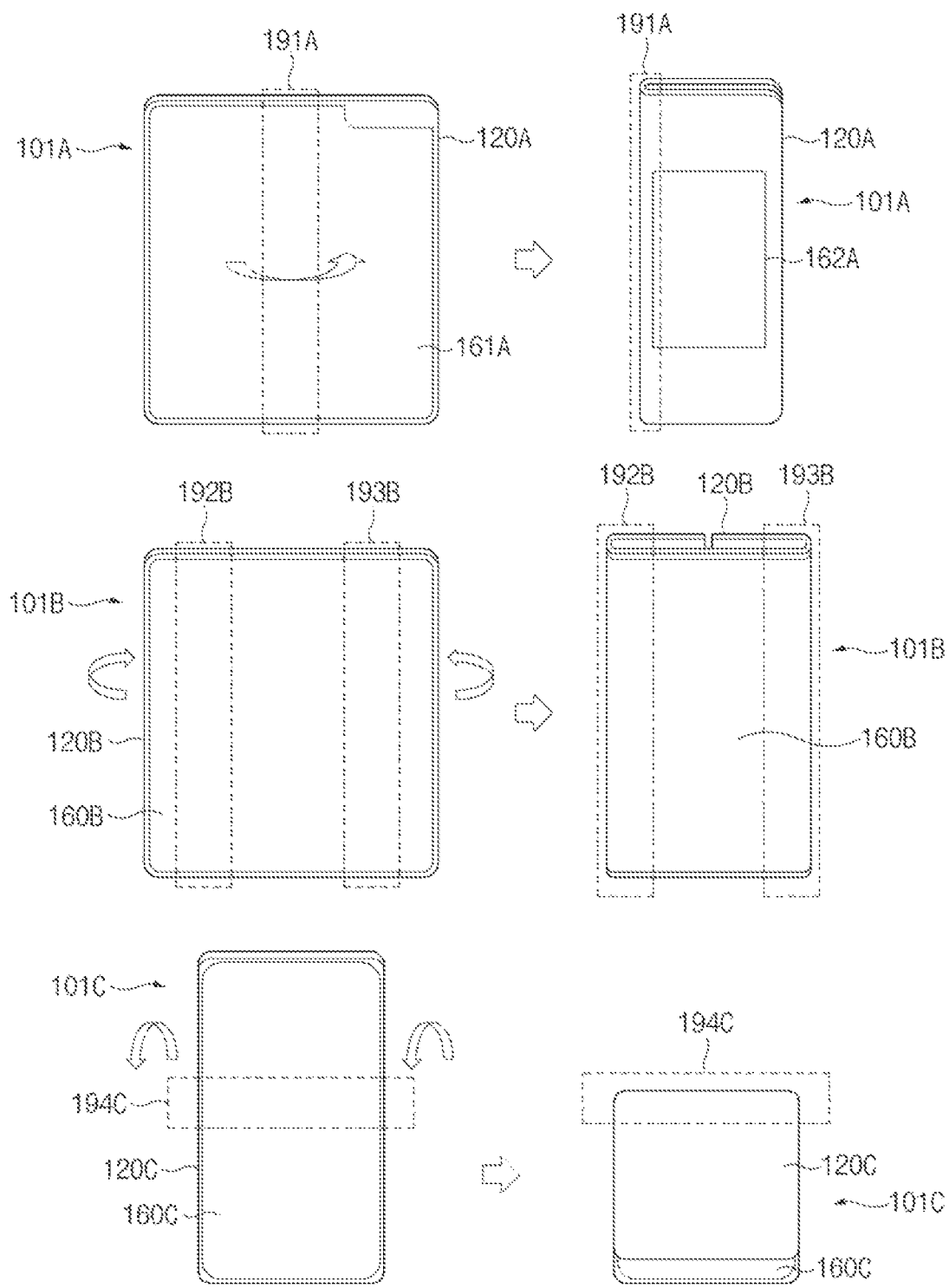
FIG. 4A illustrates foldable electronic devices having variable physical configurations, according to an embodiment.
Figure 4B:
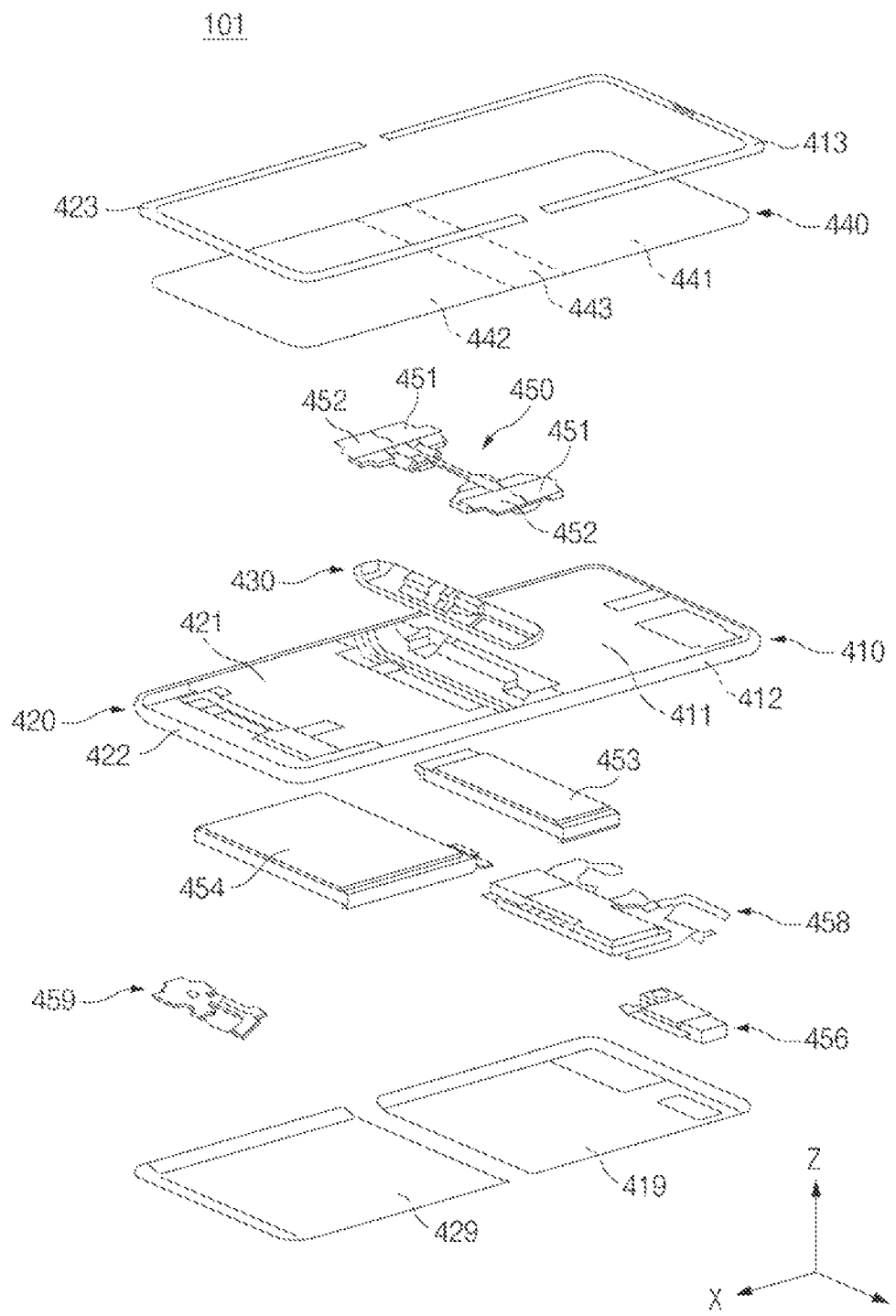
FIG. 4B is an exploded perspective view of an electronic device, according to an embodiment.
Figure 4C:
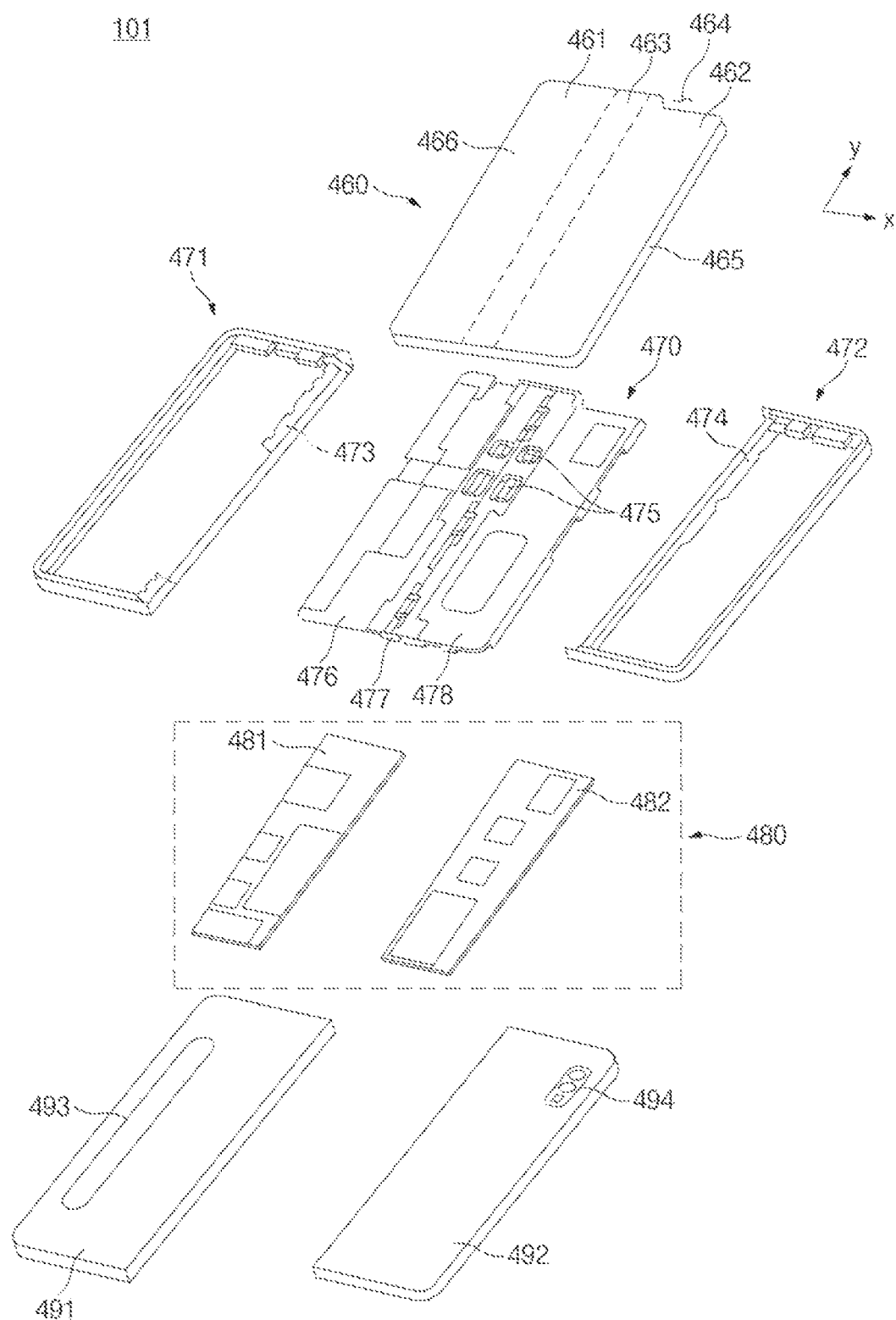
FIG. 4C is an exploded perspective view of an electronic device, according to an embodiment.

FIGS. 4A to 4C illustrates foldable electronic devices having variable physical configurations, according to certain embodiments of the disclosure.

FIG. 4A illustrates foldable electronic devices 101A, 101B, and 101C, having variable physical configurations, according to certain embodiments of the disclosure.

According to certain embodiments, an electronic device (e.g., the electronic device 101 of FIG. 1) may be folded and unfolded, and thereby changed in physical configuration. For example, the electronic device may include housing and a display (e.g., the display module 160 of FIG. 1), each of which is flexible in at least part of the housing and a display. The electronic device may be folded (e.g., closed) or unfolded (e.g., opened) around the flexible portion of the electronic device. For example, the flexible portion of the electronic device may be referred to as a folding part (e.g., a hinge structure). The folding part may refer to a portion or region in which the shape of an electronic device is capable of being changed, and is not limited to a specific structure.

According to an embodiment, the first electronic device 101A (e.g., the electronic device 101 of FIG. 1) may be folded leftwards and rightwards. For example, the first electronic device 101A may be folded about the folding part 191A. For example, the first electronic device 101A may include a first display 161A (e.g., the display module 160 of FIG. 1) and housing 120A, each of which has flexibility in a portion corresponding to the folding part 191A. The first electronic device 101A may be folded left and right about the folding part 191A. The first electronic device 101A may include a second display 162A (e.g., the display module 160 of FIG. 1) which may be exposed to an external environment in a folded state. FIG. 4A illustrates that the first electronic device 101A is an in-folding type electronic device in which the first display 161A may be folded inwardly. However, embodiments of the disclosure are not limited thereto. For example, the first electronic device 101A may be an out-fold type electronic device, or an electronic device supporting both in-fold and out-fold configurations. As another example, it is illustrated that the first display 161A indicates just one display, but embodiments of the disclosure are not limited thereto. The first electronic device 101A may also include a plurality of displays divided according to the folding part 191A. The housing 120A may also include a plurality of housings divided according to the folding part 191A. As another example, the first electronic device 101A may include a combination of a plurality of electronic devices coupled to be folded around the folding part 191A. In this case, the plurality of electronic devices may be coupled to each other via a separate structure (e.g., housing or hinge).

According to an embodiment, the second electronic device 101B (e.g., the electronic device 101 of FIG. 1) may be folded leftward and rightward about a plurality of axes. For example, the second electronic device 101B may include a display 160B (e.g., the display module 160 of FIG. 1) and housing 120B, each of which has flexibility in portions corresponding to a second folding part 192B and a third folding part 193B. The second electronic device 101B may be folded left and right around the second folding part 192B and the third folding part 193B. FIG. 4B illustrates that the first electronic device 101B is an out-fold type electronic device in which the first display 161A may be folded outwardly. However, embodiments of the disclosure are not limited thereto. For example, the second electronic device 101B may be in-folded in the second folding part 192B and/or the third folding part 193B. As another example, the second electronic device 101B may be in-folded about the second folding part 192B and may be out-folded about the third folding part 193B. As another example, it is illustrated that the display 160B includes a single display, but embodiments of the disclosure are not limited thereto. The second electronic device 101B may include a plurality of displays separated based on at least one of the second folding part 192B and the third folding part 193B. The housing 120B may also include a plurality of housings separated based on at least one of the second folding part 192B and the third folding part 193B. As another example, the second electronic device 101B may include a combination of a plurality of electronic devices coupled to be folded around the second folding part 192B and the third folding part 193B. In this case, for example, the plurality of electronic devices may be coupled to each other by a separate structure (e.g., housing or hinge).

According to an embodiment, the third electronic device 101C (e.g., the electronic device 101 of FIG. 1) may be folded upward and downward. For example, the third electronic device 101C may include a display 160C (e.g., the display module 160 of FIG. 1) and housing 120C, each of which includes a flexible portion corresponding to the at least fourth folding part 194C. The third electronic device 101C may be folded upward and downward about the fourth folding part 194C. FIG. 4 illustrates that the third electronic device 101C is an in-fold type electronic device in which the display 161B may be folded inwardly. However, embodiments of the disclosure are not limited thereto. For example, at the third folding part 193B, the third electronic device 101C may be out-folded, or may be both in-folded or out-folded. As another example, it is illustrated that the display 160C includes a single display, but embodiments of the disclosure are not limited thereto. The third electronic device 101C may include a plurality of displays separated based on the fourth folding part 194C. The housing 120C may also include a plurality of housings separated based on the folding part 194C. As another example, the third electronic device 101C may include a combination of a plurality of electronic devices coupled to be folded around the folding part 194C. In this case, the plurality of electronic devices may be coupled to each other by a separate structure (e.g., housing or hinge).

It is understood that physical reconfigurations of the electronic device (e.g., the first electronic device 101A, the second electronic device 101B, and the third electronic device 101C) shown in FIG. 4A are only an example, and embodiments of the disclosure are not limited thereto.

FIG. 4B is an exploded perspective view of the electronic device 101, according to an embodiment.

For example, the electronic device 101 illustrated in FIG. 4B may be the first electronic device 101A of FIG. 4A. Referring to FIG. 4B, the electronic device 101 may include first housing 410, second housing 420, hinge housing 430, a hinge structure 450, and a display 440 (e.g., the display module 160 of FIG. 1).

In an embodiment, the first housing 410 may be connected with the second housing 420 through the hinge structure 450. The first housing 410 may include a first plate 411 on which the display 440 is seated, and a first frame 412 surrounding at least part of the first plate 411. For example, the first frame 412 may form a part of a surface (e.g., a side surface) of the electronic device 101. For example, a part of each of a first region 441 and a folding region 443 of the display 440 may be disposed on the first plate 411. A first rotation structure 451 of the hinge structure 450 may be connected to the first plate 411. In an embodiment, at least part of the first housing 410 may be adhered to the first region 441 of the display 440. Alternatively, a part of an edge of the front surface of the first housing 410 may be adhered to an edge of the first region 441 of the display 440. In this regard, an adhesive layer may be interposed between the first plate 411 of the first housing 410 and the first region 441 of the display 440.

In an embodiment, at least part of the inner side of the first housing 410 may be provided in a form of a hollow. A first circuit board 458, a first battery 453, and a camera module 456 (e.g., the camera module 180 of FIG. 1) may be positioned inside the first housing 410 via the hollow. The first circuit board 458 and the first battery 453 may be electrically connected through a flexible substrate to a second circuit board 459 and a second battery 454, which may be disposed inside the second housing 420. For example, a processor and a memory may be disposed on the first circuit board 458. For example, the first battery 453 and the first circuit board 458 may be positioned on the first plate 411. In an embodiment, the first housing 410 may be, for example, at least partly formed of a metallic material, or at least partly formed of a non-metallic material. The first housing 410 may be formed of a material having rigidity of a sufficient magnitude so as to adequately support at least part of the display 440. In an embodiment, a portion which faces the second housing 420, in the first housing 410 may include a recessed portion, at least part of which may have a specific curvature, for accommodating placement/coupling of the hinge housing 430.

In an embodiment, the first housing 410 may include a first decorative member 413 surrounding an edge of the display 440 and a first rear cover 419, which faces the first plate 411 and forms a surface of the electronic device 101. For example, the first decorative member 413 may be positioned to cover edges of the first region 441 of the display 440 and at least part of the folding region 443. For example, in an unfolded state, the first rear cover 419 may form a rear surface of the electronic device 101, and the display 141 may form a front surface of the electronic device.

In an embodiment, the second housing 420 may be connected with the first housing 410 through the hinge structure 450. The second housing 420 may include a second plate 421, on which the display 440 is seated, and a second frame 422 surrounding at least part of the second plate 421. For example, the first frame 422 may form a part of a surface (e.g., a side surface) of the electronic device 101. For example, a part of each of the second region 442 and the folding region 443 may be disposed on the second plate 421. The second rotation structure 452 of the hinge structure 450 may be connected to the second plate 421. In an embodiment, at least part of the second housing 420 may be adhered to a second region 442 of the display 440. Alternatively, a part of the edge of the front surface of the second housing 420 may be adhered to an edge of the second region 442 of the display 440. In this regard, an adhesive layer may be interposed between the second plate 421 of the second housing 420 and the second region 442 of the display 440.

In an embodiment, at least part of the inner side of the second housing 420 may define a hollow. The second circuit board 459 and the second battery 454 may be positioned inside the second housing 420 via the hollow. The second circuit board 459 and the second battery 454 may be electrically connected through a flexible substrate to the first circuit board 458 and the first battery 453, which are positioned inside the first housing 410. For example, the second battery 454 and the second circuit board 459 may be positioned on the second plate 421. In an embodiment, the second housing 420 may be, for example, at least partly formed of a metallic material, or at least partly formed of a non-metallic material. The second housing 420 may be formed of a material having rigidity of a sufficient magnitude so as to adequately support at least part of the display 440. In an embodiment, a portion, which faces the first housing 410, in the second housing 420 may include a recessed portion, at least part of which has a specific curvature, for accommodating placement/coupling of the hinge housing 430.

In an embodiment, the second housing 420 may include a second decorative member 423 surrounding an edge of the display 440 and a second rear cover 429, which faces the second plate 421 and forms a surface of the electronic device 101. For example, the second decorative member 423 may be positioned to cover edges of the second region 442 of the display 440 and a part of the folding region 463. For example, in an unfolded state, the second rear cover 429 may form a rear surface of the electronic device 101, and the display 440 may form a front surface of the electronic device.

In an embodiment, a lattice structure (not shown) and/or a bracket (not shown) may be positioned between the display 440 and an adhesive layer. The lattice structure may include a slit region including a plurality of slits at least partially overlapping the folding region 443. Each of the plurality of slits may extend in a direction (e.g., y-axis) of the folding region 443. The plurality of slits may support the folding region 443, which is flat, in the unfolded state, and may support deformation of the folding region 463 during a folding or unfolding operation. In an embodiment, a part of the lattice structure or the bracket less than an entirety thereof may be stacked on the display 440.

In an embodiment, the hinge housing 430 may be positioned in a recessed portion of each of the first housing 410 and the second housing 420. The hinge housing 430 may be provided in a form which is elongated along the y-axis direction as a whole. A boss for fixing the hinge structure 450 may be positioned in some regions of the inner surface of the hinge housing 430.

In an embodiment, at least part of the display 440 may be flexible. For example, the display 440 may include the first region 441 disposed on the first housing 410, the second region 442 disposed on the second housing 420, and the folding region 443 positioned between the first region 441 and the second region 442. In an embodiment, the first region 441 and the second region 442 may be formed in a planar shape, and the folding region 443 may be formed so as to be deformable to a plane or curved surface.

According to an embodiment, the hinge structure 450 may include the first rotation structure 451 connected to the first housing 410, and the second rotation structure 452 connected to the second housing 420. The hinge structure 450 may be configured such that the first rotation structure 451 and the second rotation structure 452 are rotatable about respective rotation axes (e.g., a virtual axis parallel to the y-axis direction). For example, when the first housing 410 and the second housing 420 are folded or unfolded, the first rotation structure 451 and the second rotation structure 452 may rotate about respective rotation axes.

FIG. 4C is an exploded perspective view of the electronic device 101, according to an embodiment.

For example, the electronic device 101 illustrated in FIG. 4C may be the first electronic device 101C of FIG. 4A. Referring to FIG. 4C, in an embodiment, the electronic device 101 may include a display unit 460, a bracket assembly 470, a substrate part 480, a first housing structure 471, a second housing structure 472, a first rear cover 491, a second rear cover 492, and a camera assembly 494. In the disclosure, the display unit 460 may be called a "display module" or a "display assembly".

In an embodiment, the display unit 460 may include the display 466, and at least one plate or layer 465 where the display 466 is seated. In an embodiment, the plate 465 may be interposed between the display 466 and the bracket assembly 470. The display 466 may be disposed on at least part of one surface (e.g., an upper surface with respect to FIG. 4C) of the plate 465. The plate 465 may be formed in a shape corresponding to a shape of the display 460. For example, a partial region of the plate 465 may be formed in a shape corresponding to a notch 464 of the display 466.

The bracket assembly 470 may include a first bracket 476, a second bracket 478, a hinge structure interposed between the first bracket 476 and the second bracket 478, a hinge cover 477 covering the hinge structure when viewed from the external environment, and a wiring member 475 (e.g., a flexible printed circuit (FPC)) crossing the first bracket 476 and the second bracket 478.

In an embodiment, the bracket assembly 470 may be interposed between the plate 465 and the substrate part 480. For example, the first bracket 476 may be interposed between a first region 461 of the display 466 and a first substrate 481. The second bracket 478 may be interposed between a second region 462 of the display 466 and a second substrate 482.

In an embodiment, at least part of the wiring member 475 and the hinge structure may be disposed within the bracket assembly 470. The wiring member 475 may be disposed along a direction (e.g., an x-axis direction) crossing the first bracket 476 and the second bracket 478. The wiring member 475 may be disposed along a direction (e.g., the x-axis direction) perpendicular to a folding axis (e.g., the y-axis or the folding axis "A" of FIG. 5) of a folding region 463 of the electronic device 101.

As described above, the substrate part 480 may include the first substrate 481 which may be disposed on a side of the first bracket 476, and the second substrate 482 which may be disposed on a side of the second bracket 478. The first substrate 481 and the second substrate 482 may be disposed within a space defined by the bracket assembly 470, the first housing structure 471, the second housing structure 472, the first back cover 491, and the second back cover 492.

Components for implementing various functions of the electronic device 101 may be mounted on the first substrate 481 and the second substrate 482.

The first housing structure 471 and the second housing structure 472 may be assembled so as to be connected on opposite sides of the bracket assembly 470 while the display unit 460 is connected with the bracket assembly 470. As will be described later, the first housing structure 471 and the second housing structure 472 may be slid from the opposite sides of the bracket assembly 470, so as to be connected with the bracket assembly 470.

In an embodiment, the first housing structure 471 may include a first rotation support surface 473, and the second housing structure 472 may include a second rotation support surface 474 corresponding to the first rotation support surface 473. The first rotation support surface 473 and the second rotation support surface 474 may include a curved surface corresponding to the curved surface included in the hinge cover 477.

In an embodiment, when the electronic device 101 is disposed in an unfolded state, the first rotation support surface 473 and the second rotation support surface 474 may cover the hinge cover 477, and thus, the hinge cover 477 may not be exposed from a back surface of the electronic device 101, or may be less exposed. Meanwhile, when the electronic device 101 is disposed in a folded state, the first rotation support surface 473 and the second rotation support surface 474 may rotate along the curved surface included in the hinge cover 477, and thus, the hinge cover 477 may be exposed (e.g., maximally) toward the back surface of the electronic device 101.

Hereinafter, an unfolded state and a folded state of the electronic device 101 will be described later in the description of FIGS. 5 and 6. In an embodiment, the description of the same components as those shown in FIG. 5 among the components of FIG. 6 may be replaced with the description of FIG. 5.

Figure 5:
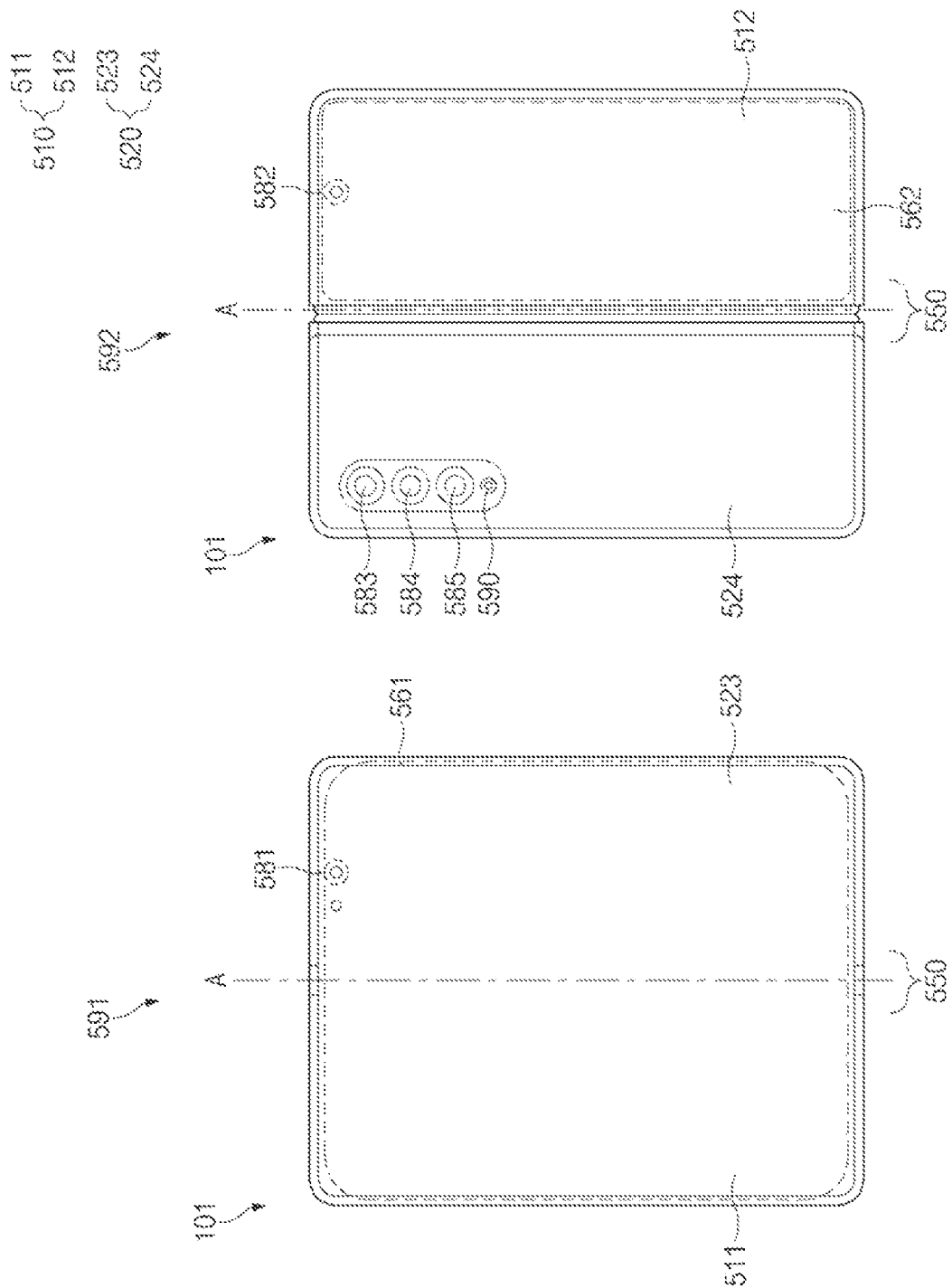
FIG. 5 illustrates an electronic device in an unfolded state, according to an embodiment.
Figure 6:
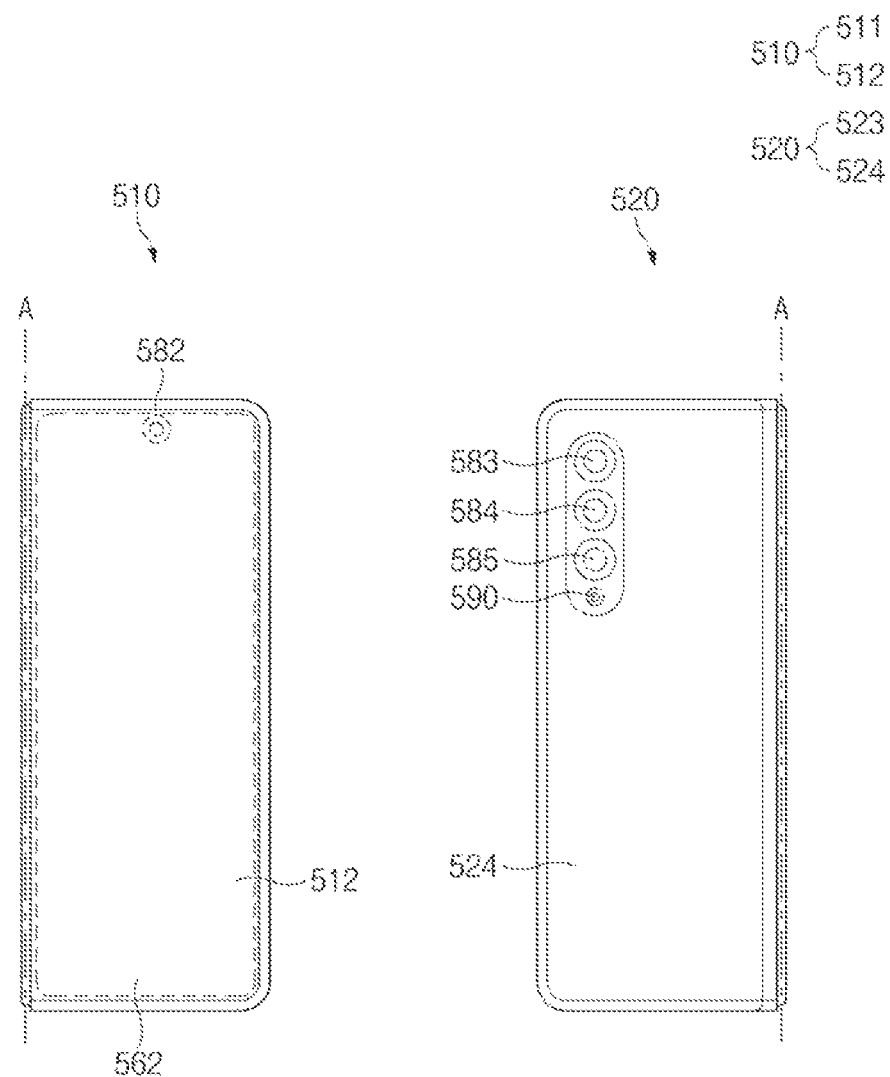
FIG. 6 illustrates an electronic device in a folded state, according to an embodiment.

Referring to FIGS. 5 and 6, according to an embodiment, the electronic device 101 may include first housing 510 and second housing 520. In an embodiment, the first housing 510 may include a first surface 511 and a second surface 512 opposite to the first surface 511. In an embodiment, the second housing 520 may include a third surface 523 and a fourth surface 524 opposite to the third surface 523. For example, the third surface 523 may be defined as a surface extending from the first surface 511.

FIG. 5 illustrates an electronic device in an unfolded state, according to an embodiment.

According to an embodiment, the electronic device 101 may include the first housing 510 and the second housing 520. In an embodiment, the first housing 510 may include the first surface 511 and the second surface 512. The second housing 520 may include the third surface 523 and the fourth surface 524. In an embodiment, the first housing 510 and the second housing 520 may be disposed on opposite sides, about an axis. For example, the first housing 510 and the second housing 520 may be positioned on opposite sides about a folding axis A and may define an overall symmetrical shape about the folding axis A. For example, the folding axis A may be referred to as an axis crossing a folding region 550 (e.g., the folding region 463 in FIG. 4C). A hinge structure may be disposed on at least part of the folding region 550.

Reference number 591 indicates a front surface of the electronic device 101 in an unfolded state. Reference number 592 indicates a rear surface of the electronic device 101 in an unfolded state.

According to an embodiment, reference number 591 indicates the front surface of the electronic device 101 in an unfolded state. In an embodiment, one or more components may be disposed on the front surface of the electronic device 101 and may be visually exposed.

In an embodiment, the electronic device 101 may include a first display 561 disposed on the first surface 511 and the third surface 523. In an embodiment, when the electronic device 101 is disposed in the unfolded state, the first display 561 may be visually exposed through the first surface 511 and the third surface 523. The electronic device 101 may display a variety of content through the first display 561. For example, the electronic device 101 may display a preview image on the first display 561 in an unfolded state. In an embodiment, the first display 561 may include a degree of flexibility about an axis. For example, the first display 561 may be flexible so as to be folded or unfolded about the folding axis A.

In an embodiment, the electronic device 101 may include a first camera 581 disposed on the third surface 523. In an embodiment, when the electronic device 101 is disposed in an unfolded state, the first camera 581 may be visually exposed through the third surface 523. The electronic device 101 may capture an image and/or video through the first camera 581. For example, the electronic device 101 may capture a preview image by using the first camera 581.

According to an embodiment, reference number 592 indicates the rear surface of the electronic device 101 in an unfolded state. In an embodiment, one or more components may be disposed on the front surface of the electronic device 101 and may be visually exposed.

In an embodiment, the electronic device 101 may include a second display 562 disposed on the second surface 512. In an embodiment, when the electronic device 101 is disposed in an unfolded state, the second display 562 may be visually exposed through the second surface 512. While providing a preview image in an unfolded state, the electronic device 101 may turn off the second display 562.

In an embodiment, the electronic device 101 may include a second camera 582 disposed on the second surface 512. In an embodiment, when the electronic device 101 is disposed in an unfolded state, the second camera 582 may be visually exposed through the second surface 512. While providing a preview image in an unfolded state, the electronic device 101 may turn off the second camera 582.

In an embodiment, the electronic device 101 may include a plurality of cameras (e.g., a third camera 583, a fourth camera 584, and a fifth camera 585) and a sensor 590 disposed on the fourth surface 524. In an embodiment, when the electronic device 101 is disposed in an unfolded state, the third camera 583, the fourth camera 584, and the fifth camera 585, and the sensor 590 may be visually exposed through the fourth surface 524. While providing a preview image in an unfolded state, the electronic device 101 may turn off the third camera 583, the fourth camera 584, and the fifth camera 585. For example, the sensor 590 may include an infrared sensor, a fingerprint sensor, and/or an illuminance sensor.

In an embodiment, cameras (e.g., the first to fifth cameras 581 to 585) included in the electronic device 101 may have different performance. For example, a plurality of cameras may have different angles of view and resolutions.

In FIG. 5, the unfolded state of the electronic device 101 is illustrated as a case where a folding angle of the electronic device 101 is 180 degrees. However, embodiments of the disclosure are not limited thereto. For example, the unfolded state may be referred to as a case where the folding angle of the electronic device 101 is between 120 degrees and 180 degrees. The number disclosed in association with the folding angle indicating the unfolded state is only an example, and may be changed by a production process of the electronic device 101, a user's setting, or other various parameters.

FIG. 6 illustrates an electronic device in a folded state, according to an embodiment. According to an embodiment, reference number 591 indicates the front surface of the electronic device 101 in an unfolded state. In an embodiment, one or more components may be disposed on the front surface of the electronic device 101 and may be visually exposed.

In an embodiment, when the electronic device 101 operates in a folded state, the second display 562 may be visually exposed through the second surface 512. The electronic device 101 may display a variety of content through the second display 562. For example, the electronic device 101 may display a preview image on the second display 562 in a folded state.

In an embodiment, when the electronic device 101 operates in a folded state, the second camera 582 may be visually exposed through the second surface 512. The electronic device 101 may obtain an image and/or video through the second camera 582. For example, the electronic device 101 may obtain a preview image by using the second camera 582.

In an embodiment, when the electronic device 101 operates in a folded state, the third camera 583, the fourth camera 584, and the fifth camera 585, and the sensor 590 may be visually exposed through the fourth surface 524. While providing a preview image in a folded state, the electronic device 101 may turn off the third camera 583, the fourth camera 584, and the fifth camera 585.

In FIG. 6, the folded state of the electronic device 101 is illustrated as a case where a folding angle of the electronic device 101 is 0 degrees. However, embodiments of the disclosure are not limited thereto. For example, the folded state may be referred to as a case where the folding angle of the electronic device 101 is between 0 degrees and 120 degrees. The number disclosed in association with the folding angle indicating the folded state is only an example, and may be changed by a production process of the electronic device 101, a user's setting, or other various parameters.

Figure 7:
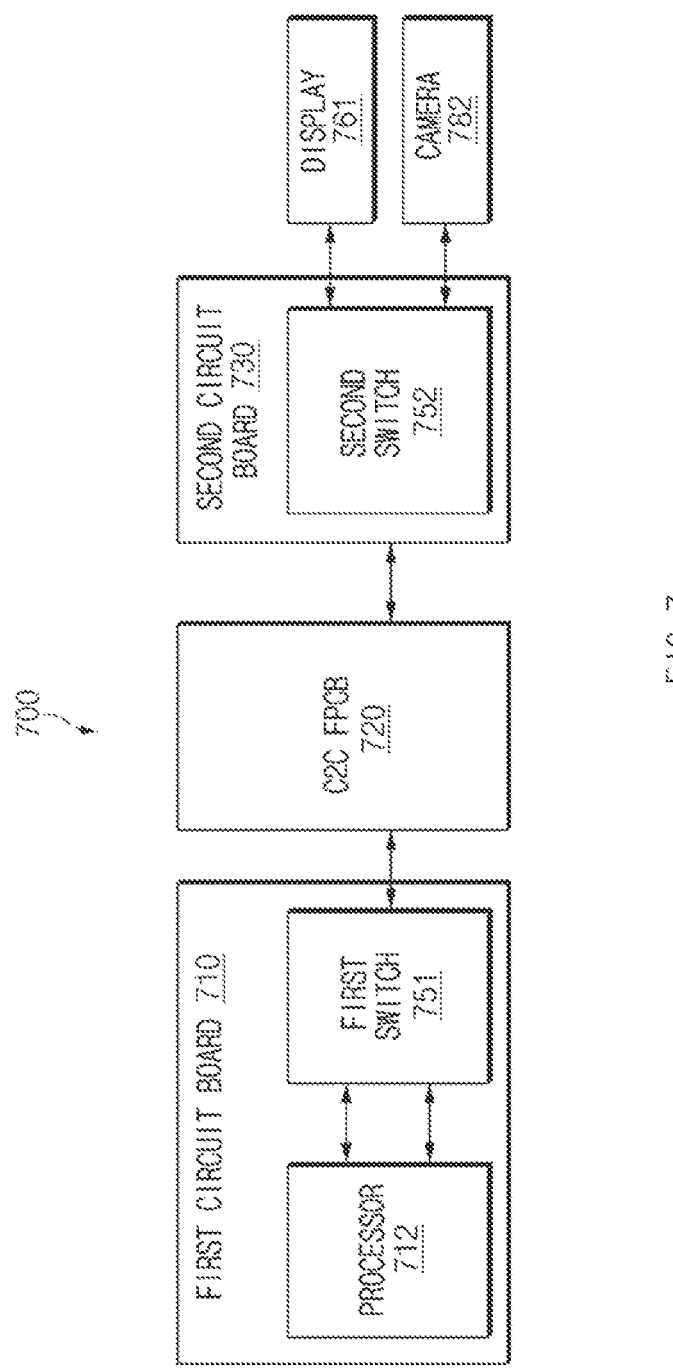
FIG. 7 is a block diagram illustrating components included in an electronic device, according to an embodiment.

FIG. 7 is a block diagram illustrating components included in an electronic device 700, according to an embodiment.

According to an embodiment, the electronic device 700 (e.g., the electronic device 101 of FIG. 1) may include a first circuit board 710, a con to con (C2C) flexible printed circuit board (FPCB) 720 (e.g., the wiring member 475 of FIG. 4), a second circuit board 730, a display 761 (e.g., the first display 561 of FIG. 5), and a camera 782 (e.g., the second camera 582 of FIGS. 5 and 6). In an embodiment, an "electronic device" to be described later in the description of FIGS. 7 to 11 may be a foldable electronic device having a shape of the electronic device 101 of FIGS. 5 and 6 described above. However, embodiments of the disclosure are not limited thereto.

In an embodiment, one or more components may be disposed on the first circuit board 710. For example, a processor 712 (e.g., the processor 120 of FIG. 1) and a first switch 751 may be positioned on the first circuit board 710.

In an embodiment, one or more components may be disposed on the second circuit board 730. For example, a second switch 752 may be disposed on the second circuit board 730.

In an embodiment, the processor 712 may communicate with the display 761 by using a specified interface. In an embodiment, the processor 712 may communicate with the display 761 by using display serial interface (DSI).

In an embodiment, the processor 712 may communicate with the camera 782 by using another specified interface. In an embodiment, the processor 712 may communicate with the camera 782 by using camera serial interface (CSI).

In an embodiment, the processor 712 may be electrically connected to the first switch 751. In an embodiment, the processor 712 may be electrically connected to the first switch 751 through a first transmission path for transmitting and receiving a signal according to DSI and a second transmission path for transmitting and receiving a signal according to CSI.

In an embodiment, at least one lane (or channel) may be included in the first transmission path and/or the second transmission path. In an embodiment, at least one lane may have the number of lanes defined in MIPI. In an embodiment, at least one lane may have the number of lanes utilized by D-PHY, C-PHY, A-PHY, or M-PHY. For example, when D-PHY is employed, four lanes may be included in the first transmission path and/or the second transmission path.

In an embodiment, the first switch 751 may mux (or demux) the first transmission path and the second transmission path. In an embodiment, the first switch 751 may be a MIPI switch. In an embodiment, the first switch 751 may select one transmission path among the first transmission path or the second transmission path. In an embodiment, the first switch 751 may select one transmission path from the first transmission path or the second transmission path based on a control signal of the processor 712. In an embodiment, the control signal may be a signal generated based on an operating state (e.g., a folded state or an unfolded state) of the electronic device 700.

In an embodiment, the first switch 751 may transmit a signal of the selected transmission path to the second switch 752 through the C2C FPCB 720. In an embodiment, the first switch 751 may output the signal of the selected transmission path through the C2C FPCB 720 to a transmission path on which a signal received from the second switch 752 is selected.

In an embodiment, the C2C FPCB 720 may electrically connect components disposed on a plurality of circuit boards 710 and 730. For example, the C2C FPCB 720 may include a plurality of connector pins and may electrically connect a plurality of components by using at least one connector pin. For example, the C2C FPCB 720 may electrically connect the first switch 751, which is disposed on the first circuit board 710, to the second switch 752 disposed on the second circuit board 730.

In an embodiment, the second switch 752 may be electrically connected to the display 761 and the camera 782.

In an embodiment, the second switch 752 may be electrically connected to at least one display (e.g., a flexible display) among a plurality of displays included in the electronic device 700. For example, when the electronic device 700 is a foldable electronic device shown in FIG. 5, the display 761 electrically connected to the second switch 752 may include the first display 561 of FIG. 5.

In an embodiment, the second switch 752 may be electrically connected to at least one camera among a plurality of cameras included in the electronic device 700. For example, when the electronic device 700 is the foldable electronic device shown in FIG. 5, the camera 782 electrically connected to the second switch 752 may include the second camera 582 of FIGS. 5 and 6.

In an embodiment, the second switch 752 may be electrically connected to the display 761 through a first transmission path for transmitting and receiving signals according to DSI. In an embodiment, the second switch 752 may be electrically connected to the camera 782 through a second transmission path for transmitting and receiving a signal according to CSI.

In an embodiment, at least one lane (or channel) may be included in the first transmission path and/or the second transmission path. In an embodiment, at least one lane may have the number of lanes defined in MIPI. In an embodiment, at least one lane may have the number of lanes utilized by D-PHY, C-PHY, A-PHY, or M-PHY.

In an embodiment, the number of lanes (or channels) included in the first transmission path between the processor 712 and the first switch 751 may be the same as the number of lanes (or channels) included in the first transmission path between the display 761 and the second switch 752. In an embodiment, the number of lanes (or channels) included in the second transmission path between the processor 712 and the first switch 751 may be the same as the number of lanes (or channels) included in the second transmission path between the camera 782 and the second switch 752.

In an embodiment, the second switch 752 may mux (or demux) the first transmission path and the second transmission path. In an embodiment, the second switch 752 may be a MIPI switch. In an embodiment, the second switch 752 may select one transmission path among the first transmission path or the second transmission path. In an embodiment, the second switch 752 may select one transmission path from the first transmission path or the second transmission path based on a control signal of the processor 712. In an embodiment, the control signal may be a signal generated based on an operating state (e.g., a folded state or an unfolded state) of the electronic device 700.

Hereinafter, an operation in which the processor 712 controls the first switch 751 and/or the second switch 752 will be described.

In an embodiment, the processor 712 may obtain information associated with the operating state of the electronic device 700 by using a sensor (e.g., the sensor module 176 of FIG. 1). In an embodiment, the processor 712 may obtain information associated with a folding angle of the electronic device 700 by using the sensor and then may determine whether the operating state of the electronic device 700 is a folded state or an unfolded state, based on the information.

In an embodiment, the processor 712 may generate a control signal indicating an operating state of the electronic device 700 based on the obtained information.

In an embodiment, the processor 712 may control the first switch 751 and the second switch 752 based on the control signal.

For example, when the operating state of the electronic device 700 is a folded state (e.g., the folded state in FIG. 6), the processor 712 may control the first switch 751 and the second switch 752 such that the processor 712 and the camera 782 are electrically connected to each other. For example, when the operating state of the electronic device 700 is a folded state, the processor 712 may control the first switch 751 and the second switch 752 such that the processor 712 and the display 761 are not electrically connected to each other. Under the control of the processor 712, the electronic device 700 may turn off the display 761 and may turn on the camera 782, in a folded state. Accordingly, while the electronic device 700 operates in a folded state, the processor 712 may obtain a preview image by using the camera 782 electrically connected. The processor 712 may display the obtained preview image on a display (e.g., the second display 562 of FIGS. 5 and 6) other than the display 761.

For example, when the operating state of the electronic device 700 is an unfolded state (e.g., the unfolded state in FIG. 5), the processor 712 may control the first switch 751 and the second switch 752 such that the processor 712 and the display 761 are electrically connected to each other. For example, when the operating state of the electronic device 700 is an unfolded state (e.g., the unfolded state in FIG. 5), the processor 712 may control the first switch 751 and the second switch 752 such that the processor 712 and the camera 782 are not electrically connected to each other. Under the control of the processor 712, the electronic device 700 may turn on the display 761 and may turn off the camera 782, in an unfolded state. Accordingly, while the electronic device 700 operates in an unfolded state, the processor 712 may obtain a preview image by using a camera (e.g., the first camera 581 of FIG. 5) other than the camera 782 that is not electrically connected. The processor 712 may display the obtained preview image on the display 761 thus electrically connected.

For example, when the operating state of the electronic device 700 is changed from a folded state to an unfolded state, the processor 712 may control the first switch 751 and the second switch 752 so as not to be electrically connected to the camera 782 thus electrically connected and to be electrically connected to the display 761 that is not electrically connected. As another example, when the operating state of the electronic device 700 is changed from a folded state to an unfolded state, the processor 712 may control the first switch 751 and the second switch 752 so as to deactivate the second transmission path between the processor 712 and the camera 782, which has been active, and to activate the first transmission path between the processor 712 and the display 761. Under the control of the processor 712, when the operating state of the electronic device 700 is changed from a folded state to an unfolded state, the display 761 may be turned on and the camera 782 may be turned off. Accordingly, when the operating state of the electronic device 700 is changed from a folded state to an unfolded state, the processor 712 may obtain a preview image by using another camera other than the camera 782 that is not electrically connected (or turned off). The processor 712 may display the obtained preview image on the display 561 thus electrically connected (or turned on).

FIG. 7 illustrates two switches. However, this is an example, and embodiments of the disclosure are not limited thereto. In another embodiment, the first switch 751 and the second switch 752 may be implemented as one switch. For example, when the first switch 751 and the second switch 752 are implemented as one switch, the one switch may activate one transmission path among the first transmission path between the processor 712 and the display 761 or the second transmission path between the processor 712 and the camera 782 and may deactivate the other transmission path. For example, when the first switch 751 and the second switch 752 are implemented as one switch, the one switch may be positioned on one of the first circuit board 710, the C2C FPCB 720, or the second circuit board 730.

Hereinafter, an electrical connection structure of the processor 712, the first switch 751, the second switch 752, the display 761, and the camera 782 may be described in detail later in the disclosure of FIGS. 8A to 8C.

Figure 8A:
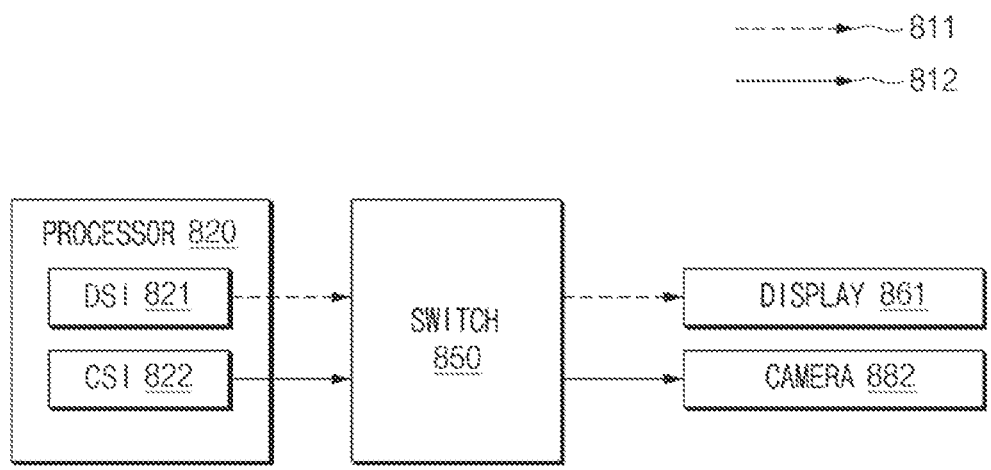
FIG. 8A illustrates a plurality of transmission paths between components included in an electronic device, according to an embodiment.

FIG. 8A illustrates a plurality of transmission paths between components included in an electronic device, according to an embodiment. FIG. 8B illustrates an example in which a transmission path between a processor and a display is activated. FIG. 8C illustrates an example in which a transmission path between a processor and a camera is activated.

According to an embodiment, an electronic device (e.g., the electronic device 101 of FIG. 1) may include a processor 820 (e.g., the processor 120 of FIG. 1 or the processor 712 of FIG. 7), a switch 850, a display 861 (e.g., the display module 160 of FIG. 1 or the first display 561 of FIG. 5), and a camera 882 (e.g., the camera module 180 of FIG. 1 or the second camera 582 of FIG. 5).

In an embodiment, the processor 820 may be electrically connected to external components based on various interfaces. For example, the processor 820 may be electrically connected to the display 861 and/or the camera 882 based on DSI 821 and/or CSI 822. For example, the processor 820 may transmit data having various types based on a DSI protocol through a first transmission path 811 that is a transmission path between the processor 820, the switch 850, and the display 861. As another example, the processor 820 may transmit data having various types based on the CSI 822 through a second transmission path 812 that is a transmission path between the processor 820, the switch 850, and the camera 882.

In an embodiment, the processor 820 may control the switch 850 based on various criteria. For example, the processor 820 may control the switch 850 based on an operating state (e.g., unfolded state or folded state) of an electronic device. For example, the processor 820 may identify the operating state (e.g., folded state or unfolded state) of the electronic device by using a sensor (e.g., the sensor module 176 of FIG. 1) and may control the switch 850 by using a control signal generated based on the identified operating state.

In an embodiment, the switch 850 may include at least one switch circuit. For example, the switch 850 may include a plurality of switches (e.g., the first switch 751 and/or the second switch 752 of FIG. 7).

In an embodiment, the switch 850 may be electrically connected to at least one display (e.g., a flexible display) among a plurality of displays included in the electronic device. For example, when the electronic device is a foldable electronic device shown in FIG. 5, the display 861 electrically connected to the switch 850 may include the first display 561 of FIG. 5.

In an embodiment, the switch 850 may be electrically connected to at least one camera among a plurality of cameras included in the electronic device. For example, when the electronic device is a foldable electronic device shown in FIG. 5, the camera 882 electrically connected to the switch 850 may include the second camera 582 of FIGS. 5 and 6.

In an embodiment, the switch 850 may selectively transmit at least part of the muxed (i.e., multiplexed) pieces of data to the display 861 or the camera 882 under the control of the processor 820. For example, the switch 850 may selectively transmit at least part of the muxed pieces of data to the display 861 or the camera 882 based on a control signal transmitted from the processor 820.

In an embodiment, the processor 820 may select at least part of the muxed pieces of data based on the operating state of the electronic device. For example, the processor 820 may identify information about the operating state of the electronic device by using a sensor and then the processor 820 may select at least part of the muxed pieces of data based on the signal generated based on the identified information.

In an embodiment, the processor 820 may control the switch 850 so as to activate at least one of a plurality of transmission paths. For example, the processor 820 may control the switch 850 based on the operating state of the electronic device so as to activate the first transmission path 811 and to deactivate the second transmission path 812. As another example, the processor 820 may control the switch 850 so as to deactivate the first transmission path 811 and to activate the second transmission path 812.

Figure 8B:
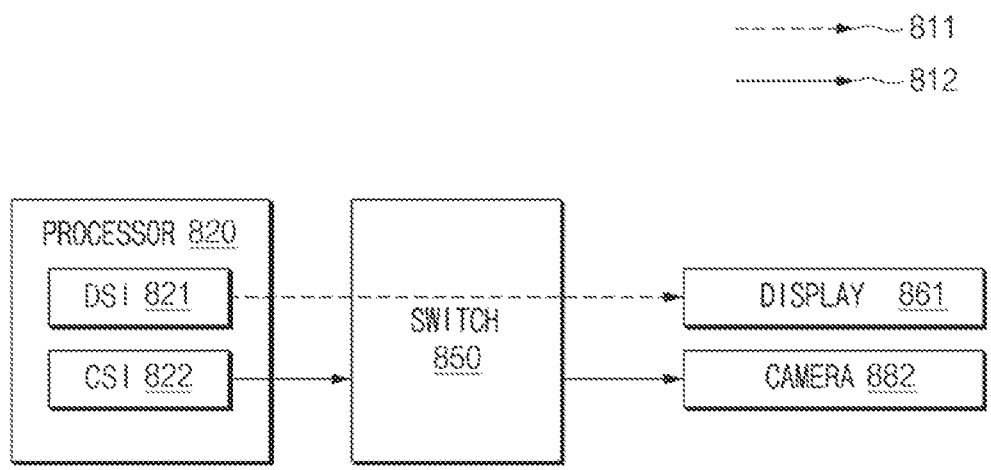
FIG. 8B illustrates an example in which a transmission path between a processor and a display is activated.

Referring to FIG. 8B, according to an embodiment, the processor 820 may perform data transmission through the first transmission path 811 and may block data transmission through the second transmission path 812. In an embodiment, the processor 820 may control the switch 850 so as to activate the first transmission path 811 and to deactivate the second transmission path 812.

In an embodiment, the processor 820 may select first data associated with the display 861 among the muxed pieces of data based on a signal indicating that the operating state of the electronic device is an unfolded state. For example, on the basis of the signal indicating that the operating state of the electronic device is the unfolded state, the processor 820 may control the switch 850 so as to select the first data, which allows the display 861 to be turned on, and to transmit the selected first data to the display 861. For example, the processor 820 may control the switch 850 so as to activate the transmission of first data through the first transmission path 811 and to transmit the first data associated with the display 861 to the display 861 based on the DSI 821. For example, the display 861 may be turned on based on the received first data.

In an embodiment, the processor 820 may select the first data associated with the display 861 among the muxed pieces of data based on a signal indicating that the operating state of the electronic device is changed from a folded state to an unfolded state. For example, the processor 820 may control the switch 850 based on the signal indicating that the operating state of the electronic device is changed from a folded state to an unfolded state so as to turn off the camera 882 by deactivating the second transmission path 812 that was being activated, and to transmit the first data, which allows the display 861 to be turned on sequentially after the camera 882 is turned off, to the display 861. For example, the processor 820 may control the switch 850 so as to activate the transmission of first data through the first transmission path 811 and to transmit the first data associated with the display 861 to the display 861 based on the DSI 821. For example, the display 861 may be turned on based on the received first data. For example, while the first data is transmitted to the display 861 through the first transmission path 811, the processor 820 may control the switch 850 such that data transmission through the second transmission path 812 is blocked. For example, as the processor 820 controls the switch 850 based on the signal, the camera 882 may be in an off state.

Figure 8C:
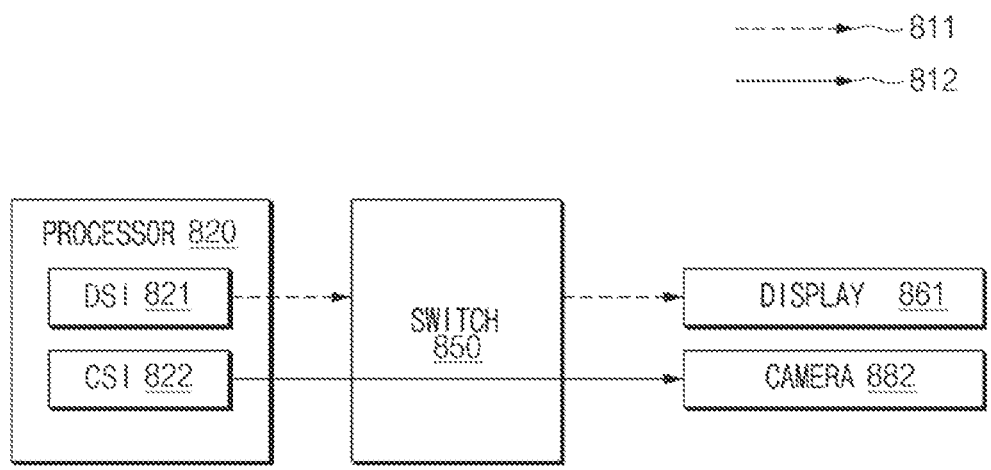
FIG. 8C illustrates an example in which a transmission path between a processor and a camera is activated.

Referring to FIG. 8C, according to an embodiment, the processor 820 may perform data transmission through the second transmission path 812 and may block data transmission through the first transmission path 811. In an embodiment, the processor 820 may control the switch 850 so as to activate the second transmission path 812 and to deactivate the first transmission path 811.

In an embodiment, the processor 820 may select second data associated with the camera 882 among the muxed pieces of data based on a signal indicating that the operating state of the electronic device is a folded state. For example, on the basis of the signal indicating that the operating state of the electronic device is the folded state, the processor 820 may control the switch 850 so as to select the second data, which allows the camera 882 to be turned on, and to transmit the selected second data to the camera 882. For example, the processor 820 may control the switch 850 so as to activate the transmission of second data through the second transmission path 812 and to transmit the second data associated with the camera 882 to the camera 882 based on the CSI 822. For example, the camera 882 may be turned on based on the received second data.

In an embodiment, the processor 820 may select the second data associated with the camera 882 among the muxed pieces of data based on a signal indicating that the operating state of the electronic device is changed from an unfolded state to a folded state. For example, the processor 820 may control the switch 850 based on the signal indicating that the operating state of the electronic device is changed from an unfolded state to a folded state so as to turn off the display 861 by deactivating the first transmission path 811 that was being activated, and to transmit the second data, which allows the camera 882 to be turned on sequentially after the display 861 is turned off, to the camera 882. For example, the processor 820 may control the switch 850 so as to activate the transmission of second data through the second transmission path 812 and to transmit the second data associated with the camera 882 to the camera 882 based on the CSI 822. For example, the camera 882 may be turned on based on the received second data. For example, while the second data is transmitted to the camera 882 through the second transmission path 812, the processor 820 may control the switch 850 such that data transmission through the first transmission path 811 is blocked. For example, as the processor 820 controls the switch 850 based on the signal, the display 861 may be in an off state.

Figure 9:
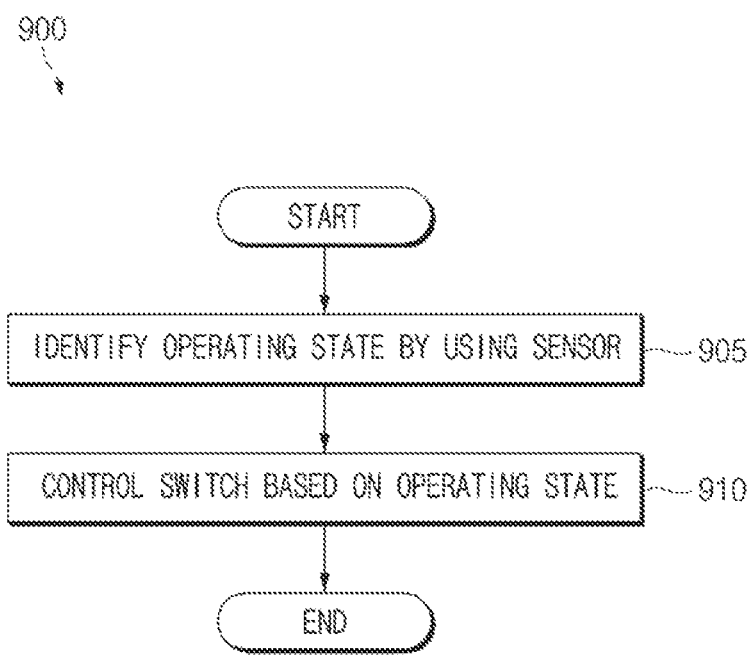
FIG. 9 is an operating flowchart of an electronic device, according to an embodiment.

FIG. 9 is an operating flowchart 900 of an electronic device, according to an embodiment.

According to an embodiment, an electronic device (e.g., the electronic device 101 of FIG. 1) may perform operations illustrated in FIG. 9. For example, a processor of the electronic device (e.g., the processor 120 of FIG. 1 or the processor 712 of FIG. 7) may be configured to perform operations of FIG. 9 when instructions stored in a memory (e.g., the memory 130 of FIG. 1) are executed.

In operation 905, the electronic device may identify an operating state of the electronic device by using a sensor (e.g., the sensor module 176 of FIG. 1). For example, the electronic device may obtain information associated with the operating state of the electronic device by using a sensor. The electronic device may identify the operating state of the electronic device based on the obtained information. For example, the electronic device may identify whether the operating state of the electronic device is an unfolded state (e.g., the unfolded state of FIG. 5) or a folded state (e.g., the folded state of FIG. 6) based on the obtained information.

In operation 910, the electronic device may control a switch (e.g., the switch 850 of FIG. 8) based on the identified operating state. For example, the electronic device may generate a signal indicating the operating state of the electronic device based on the obtained information. The electronic device may control the switch based on the signal.

Figure 10:
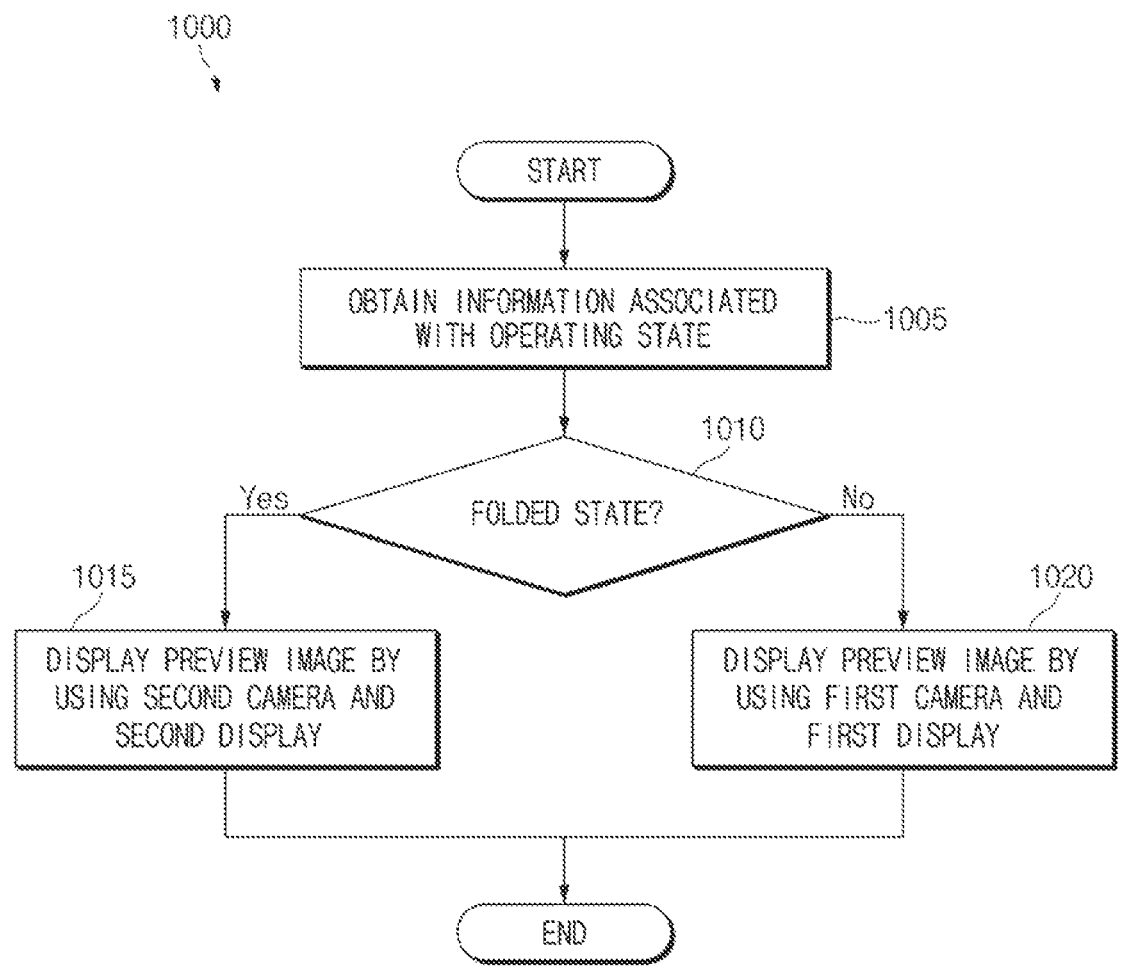
FIG. 10 is an operating flowchart of an electronic device, according to an embodiment.

FIG. 10 is an operating flowchart 1000 of an electronic device, according to an embodiment.

According to an embodiment, an electronic device (e.g., the electronic device 101 of FIG. 1) may perform operations illustrated in FIG. 10. For example, a processor of the electronic device (e.g., the processor 120 of FIG. 1 or the processor 712 of FIG. 7) may be configured to perform operations of FIG. 10 when instructions stored in a memory (e.g., the memory 130 of FIG. 1) are executed.

In operation 1005, the electronic device may obtain information associated with an operating state. For example, the electronic device may obtain information associated with the operating state by using a sensor (e.g., the sensor module 176 of FIG. 1). The electronic device may generate a signal indicating the operating state of the electronic device based on the obtained information.

In operation 1010, the electronic device may determine whether the operating state is a folded state (e.g., folded state of FIG. 6). For example, the electronic device may determine whether the electronic device is in a folded state, based on the generated signal.

For example, when the electronic device is identified as being in the folded state (e.g., operation 1010-Yes), the electronic device may perform operation 1015.

For example, when the electronic device is identified as not being in the folded state (or when the electronic device is identified as being in an unfolded state) (e.g., operation 1010— No), the electronic device may perform operation 1020.

In operation 1015, when the electronic device is identified as operating in the folded state, the electronic device may display a preview image by using a second camera (e.g., the second camera 582 of FIGS. 5 and 6) and a second display (e.g., the second display 562 of FIGS. 5 and 6). For example, the electronic device may control the switch so as to turn off the first display (e.g., the first display 561 of FIG. 5) and to turn on the second camera (e.g., the second camera 582 of FIGS. 5 and 6). For example, the electronic device may display the preview image obtained by using the second camera on the second display in the folded state. For example, while the electronic device operates in the folded state, the first display (e.g., the first display 561 of FIG. 5) and the first camera (e.g., the first camera 581 of FIG. 5) may be in an off state.

In operation 1020, when the electronic device is identified as operating in the unfolded state, the electronic device may display the preview image by using the first display and the first camera. For example, an electronic device may control a switch so as to turn on the first display and to turn off the second camera. For example, the electronic device may display the preview image obtained by using the first camera on the first display in the unfolded state. For example, while the electronic device operates in the unfolded state, the second display and the second camera may be in an off state.

Figure 11:
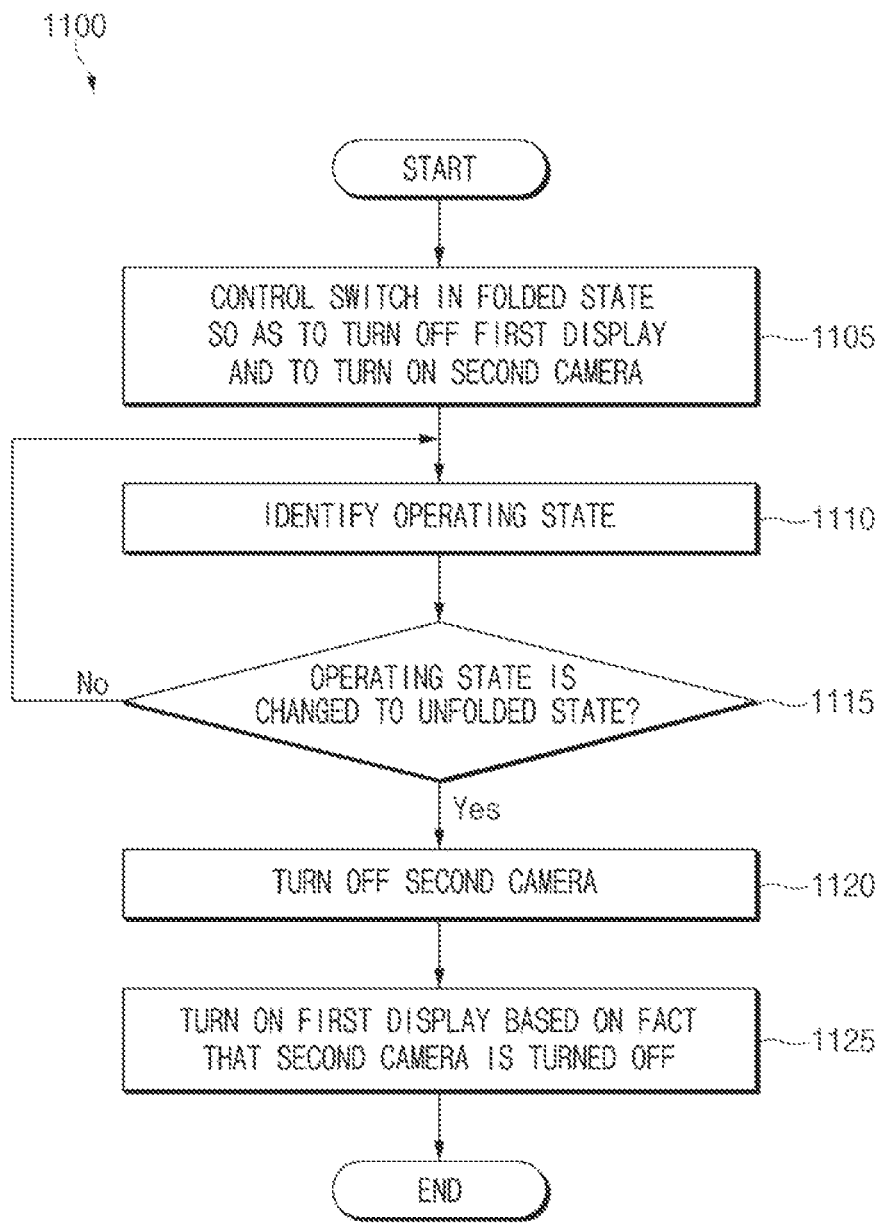
FIG. 11 is an operating flowchart of an electronic device, according to an embodiment.

FIG. 11 is an operating flowchart 1100 of an electronic device, according to an embodiment.

According to an embodiment, an electronic device (e.g., the electronic device 101 of FIG. 1) may perform operations illustrated in FIG. 11. For example, a processor of the electronic device (e.g., the processor 120 of FIG. 1 or the processor 712 of FIG. 7) may be configured to perform operations of FIG. 11 when instructions stored in a memory (e.g., the memory 130 of FIG. 1) are executed.

In operation 1105, the electronic device may control a switch (e.g., the switch 850 of FIG. 8) in a folded state (e.g., the folded state of FIG. 6) so as to turn off a first display (e.g., the first display 561 of FIG. 5) and to turn on a second camera (e.g., the second camera 582 of FIGS. 5 and 6). For example, the electronic device may control the switch so as to block the transmission of data through a first transmission path (e.g., the first transmission path 811 in FIG. 8) and to transmit second data to the second camera through a second transmission path (e.g., the second transmission path 812 in FIG. 8). For example, in the folded state, the electronic device may display the preview image obtained using the second camera on a second display (e.g., the second display 562 of FIGS. 5 and 6).

In operation 1110, the electronic device may identify an operating state of the electronic device. For example, if the second camera is operating while the electronic device is disposed in the folded state, the electronic device may obtain information associated with the operating state using a sensor (e.g., the sensor module 176 of FIG. 1), and detect the folded operating state of the electronic device based on the obtained information.

In operation 1115, the electronic device may determine whether the operating state changes from the folded state to an unfolded state (e.g., the unfolded state of FIG. 5).

For example, when the operating state of the electronic device is changed to the unfolded state (e.g., operation 1115-Yes), the electronic device may perform operation 1120.

For example, when the operating state of the electronic device is not changed to the unfolded state (or when it is maintained in the folded state) (e.g., operation 1115— No), the electronic device may repeat execution of operation 1110.

In operation 1120, the electronic device may turn off the second camera and may turn on the first display using a switch. For example, when it is identified that the operating state of the electronic device is changed from the folded state to the unfolded state, the electronic device may deactivate the second transmission path between the processor and the second camera. For example, because the second transmission path between the processor and the second camera is deactivated, the second camera may be turned off. For example, the electronic device may deactivate the second transmission path using a switch, via control by the processor, and may identify whether the second camera is turned off. For example, when it is identified that the second camera is turned off, the electronic device may perform operation 1125.

In operation 1125, the electronic device may turn on the first display by using a switch based on a fact that the second camera is turned off. For example, when the second camera is turned off as the second transmission path is deactivated in operation 1120, the electronic device may control the switch such that the first display is sequentially turned on after the second camera is turned off. For example, the electronic device may control the switch so as to activate the first transmission path between the processor and the first display. For example, the electronic device may control the switch so as to block the data transmission through the second transmission path and may transmit the first data to the first display through the first transmission path. Accordingly, in the unfolded state, the electronic device may display the preview image obtained by using the first camera (e.g., the first camera 581 in FIG. 5) on the first display.

FIG. 12 is a table indicating operational times of an electronic device, according to an embodiment.

In an embodiment, an electronic device (e.g., the electronic device 101 of FIG. 1) may sequentially perform operations according to FIG. 12. For example, the electronic device may determine whether to operate a first display (e.g., the first display 561 of FIG. 5), a first camera (e.g., the first camera 581 of FIG. 5), a second display (e.g., the second display 562 of FIG. 5), and/or a second camera (e.g., the second camera 582 of FIG. 5), based on an operating state.

In an embodiment, the electronic device may detect that the operating state of the electronic device has changed. For example, the electronic device may detect that the operating state of the electronic device has changed from a folded state (e.g., the folded state of FIG. 6) to an unfolded state (e.g., the unfolded state of FIG. 5), via a sensor (e.g., the sensor module 176 of FIG. 1).

In an embodiment, the electronic device may turn off the second camera based on a fact that the operating state has changed from the folded state to the unfolded state. For example, the electronic device may transmit, to a switch, a control signal, which controls deactivation of a second transmission path (e.g., the second transmission path 812 of FIG. 8A) between a processor (e.g., the processor 820 of FIG. 8A), a switch (e.g., the switch 850 of FIG. 8A), and a second camera (e.g., the second camera 882 of FIG. 8A). For example, an electronic device according to the conventional technology may utilize 21 ms from a point in time when the operating state starts to be changed to a point in time at which the second camera is turned off. For example, the electronic device according to an embodiment of the disclosure may utilize 18 ms from a point in time when the operating state begins change from the folded state to the unfolded state to a point in time in which the second camera is turned off.

In an embodiment, the electronic device may identify that the second camera is turned off and may turn on the first display sequentially. For example, when the second camera is off, the electronic device may transmit, to the switch, a control signal that allows the first transmission path (e.g., the first transmission path 811 in FIG. 8A) between the processor, the switch, and the first display (e.g., the first the display 861 in FIG. 8A). For example, the electronic device according to the conventional technology may utilize 165 ms from a point in time when the operating state begins change from the folded state to the unfolded state to a point in time at which the first display is turned on. For example, the electronic device according to an embodiment of the disclosure may utilize 500 ms from a point in time when the operating state begins change from the folded state to the unfolded state to a point in time at which the first display is turned on.

In an embodiment, when the first display is turned on, the electronic device may turn on the first camera. The electronic device may independently perform the turn-on of the first display and the turn-on of the first camera (e.g., sequentially and non-simultaneously). For example, the electronic device according to the conventional technology may utilize 615 ms from a point in time when the operating state begins change from the folded state to the unfolded state to a point in time at which the first camera is turned on. For example, the electronic device according to an embodiment of the disclosure may utilize 517 ms from a point in time when the operating state begins change from the folded state to the unfolded state to a point in time at which the first camera is turned on.

In an embodiment, the electronic device may display the preview image obtained by using the first camera through the first display. For example, the electronic device according to the conventional technology may utilize 1,086 ms from a point in time when the operating state begins change to a point in time at which the preview image is displayed on the first display. For example, the electronic device according to an embodiment of the disclosure may utilize 866 ms from a point in time in which the operating state begins change from the folded state to the unfolded state until the preview image is displayed.

As shown in FIG. 12, according to an embodiment of the disclosure, a time utilized to display the preview image on the first display after the operating state of the electronic device is changed from the folded state to the unfolded state may be reduced, as compared to an electronic device operating under conventional technology and techniques. That is, the data allocation order may be reliably secured by turning on the first display sequentially, depending on whether the second camera is operative. Furthermore, as compared with the conventional technology, the electronic device according to an embodiment may reduce a time utilized from a point in time when the operating state beings change, to a time point at which the preview image is finally displayed, thereby providing the preview image more rapidly, increasing usability and convenience for users.

According to an embodiment of the present disclosure, a foldable electronic device may include a display, a camera, a processor, a switch electrically connecting the processor to one of the display or the camera, and a memory operatively connected to the display, the camera, and the processor and storing instructions. For example, when executed by the processor, the instructions may cause the foldable electronic device to control the switch based on a signal indicating an operating state of the foldable electronic device.

According to an embodiment, when executed by the processor, the instructions may cause the foldable electronic device to select at least part of muxed pieces of data based on the signal, to transmit the first data to the display through a first transmission path by using display serial interface (DSI) when the selected at least part of the pieces of data is first data associated with the display, and to transmit the second data to the camera through a second transmission path by using camera serial interface (CSI) when the selected at least part of the pieces of data is second data associated with the camera.

According to an embodiment, when executed by the processor, the instructions may cause the foldable electronic device to control the switch such that the display is turned off, while obtaining a preview image by turning on the camera when the signal indicates that the operating state of the foldable electronic device is a folded state, and to turn off the camera and turn on the display, by using the switch when the signal indicates that the operating state of the foldable electronic device is changed from the folded state to an unfolded state.

According to an embodiment, the first transmission path may be a transmission path between the processor, the switch, and the display. The second transmission path may be a transmission path between the processor, the switch, and the camera.

According to an embodiment, when executed by the processor, the instructions may cause the foldable electronic device to turn off the camera and turn on the display sequentially after the camera is turned off, by using the switch when the signal indicates that the operating state of the foldable electronic device is changed from a folded state to an unfolded state.

According to an embodiment, the foldable electronic device may further include a first housing including a first surface and a second surface that is a surface opposite to the first surface and a second housing including a third surface extending from the first surface and a fourth surface that is a surface opposite to the third surface. The display may correspond to a first display positioned on the first surface and the third surface.

According to an embodiment, the foldable electronic device may further include a hinge structure connecting the first housing and the second housing. The first surface and the third surface may be separated based on the hinge structure.

According to an embodiment, the camera may correspond to a second camera positioned on the second surface.

According to an embodiment, the foldable electronic device may further include a second display positioned on the second surface. When executed by the processor, the instructions may cause the foldable electronic device to control the switch so as to turn off the first display and to turn on the second camera while the foldable electronic device operates in a folded state and to display a preview image obtained by using the second camera on the second display.

According to an embodiment, the foldable electronic device may further include a first camera positioned on the third surface. When executed by the processor, the instructions may cause the foldable electronic device to turn on the first display and to turn off the second camera, by using the switch while the foldable electronic device operates in an unfolded state and to display a preview image obtained by using the first camera on the first display.

According to an embodiment, the switch may include a first switch and a second switch. The foldable electronic device may further include a first circuit board on which the processor and the first switch are positioned, a second circuit board on which the second switch is positioned, and a flexible printed circuit board (FPCB) operatively connecting the first switch and the second switch.

According to an embodiment, the foldable electronic device may further include a sensor. When executed by the processor, the instructions may cause the foldable electronic device to identify the operating state of the foldable electronic device by using the sensor while obtaining a preview image by using the camera.

According to an embodiment, the switch may include a mobile industry processor interface (MIPI) switch.

According to an embodiment of the present disclosure, a method in which a foldable electronic device displays a preview image may include obtaining information associated with an operating state of the foldable electronic device by using a sensor, identifying the operating state of the foldable electronic device based on the obtained information, and controlling a switch so as to selectively connect a processor to one of a display or a camera based on the identified operating state of the foldable electronic device.

According to an embodiment, the controlling of the switch based on the identified operating state of the foldable electronic device may include selecting at least part of muxed pieces of data based on the operating state, transmitting the first data to the display through a first transmission path by using DSI when the selected at least part of the pieces of data is first data associated with the display, and transmitting the second data to the camera through a second transmission path by using CSI when the selected at least part of the pieces of data is second data associated with the camera.

According to an embodiment, the method in which the foldable electronic device displays the preview image may further include turning off a first display and turning on a second camera, by using the switch while the foldable electronic device operates in a folded state, identifying the operating state of the foldable electronic device by using the sensor while the second camera operates, and turning off the second camera and turning on the first display, by using the switch when it is identified that the operating state of the foldable electronic device is changed from the folded state to an unfolded state.

According to an embodiment, the turning off of the second camera and the turning on of the first display by using the switch when it is identified that the operating state of the foldable electronic device is changed from the folded state to the unfolded state may include controlling the switch such that the first display is turned on sequentially after the second camera is turned off.

According to an embodiment, the first transmission path may be a transmission path between the processor, the switch, and the display. The second transmission path may be a transmission path between the processor, the switch, and the camera.

According to an embodiment, the display may correspond to a first display positioned on a first surface of the foldable electronic device and a third surface extending from the first surface. The camera may correspond to a second camera positioned on a second surface that is a surface opposite to the first surface.

According to an embodiment, the method in which the foldable electronic device displays the preview image may further include controlling the switch such that the processor is electrically connected to the second camera when the foldable electronic device operates in a folded state, and displaying a preview image obtained by using the second camera on a second display positioned on the second surface.

According to an embodiment, the method in which the foldable electronic device displays the preview image may further include controlling the switch such that the processor is electrically connected to the first display when the foldable electronic device operates in an unfolded state, and displaying a preview image obtained by using a first camera positioned on the third surface on the first display.

What is claimed is:

1. A foldable electronic device, comprising:
   a housing including a first housing structure and a second housing structure:
   a first display disposed on the first housing structure and the second housing structure and facing a first direction;
   a second display disposed on the first housing structure and facing a second direction opposite to the first direction;
   a first camera disposed on the second housing structure and facing the first direction:
   a second camera disposed on the first housing structure and facing the second direction:
   at least one processor;
   at least one switch configured to electrically connect the at least one processor to at least one of the first display, the second display, the first camera or the second camera; and
   a memory operatively connected to the at least one processor and storing instructions executable by the at least one processor to cause the foldable electronic device to:
   control the at least one switch to turn on the first display and the first camera or turn on the second display and the second camera based on a signal indicating an operating state of the foldable electronic device.

2. The foldable electronic device of claim 1, wherein the instructions are further executable by the at least one processor to cause the foldable electronic device to:
   select at least a part of multiplexed pieces of data based on the signal;
   when the selected at least the part of the multiplexed pieces of data includes first data associated with the display, transmit the first data to at least one the turned on display through a first transmission path using a display serial interface (DSI) of the foldable electronic device; and
   when the selected at least the part of the multiplexed pieces of data includes second data associated with the camera, transmit the second data to turned on camera through a second transmission path using a camera serial interface (CSI) of the foldable electronic device.

3. The foldable electronic device of claim 1, wherein the instructions are further executable by the at least one processor to cause the foldable electronic device to:
   when the signal indicates that the operating state of the foldable electronic device is the folded state, control the at least one switch such that the first display is turned off, while obtaining a preview image by turning on the second camera; and
   when the signal indicates a change in the operating state of the foldable electronic device from the folded state to an unfolded state, turn off the second camera and turn on the first display, via operation of the at least one switch.

4. The foldable electronic device of claim 2, wherein the first transmission path communicably couples the at least one processor, the at least one switch, and the turned on display, and
   wherein the second transmission path communicably couples the at least one processor, the at least one switch, and the turned on camera separately from the first transmission path.

5. The foldable electronic device of claim 1, wherein the instructions are further executable by the at least one processor to cause the foldable electronic device to:
   when the signal indicates a change in the operating state of the foldable electronic device from the folded state to an unfolded state, operate the at least one switch to sequentially turn off the second camera, and turn on the first display sequentially after the second camera is turned off, by using the at least one switch.

6. The foldable electronic device of claim 1, further comprising:
   a hinge structure rotatably connecting the first housing structure and the second housing structure,
   wherein the first surface and the third surface are separated by the hinge structure.

7. The foldable electronic device of claim 1,
   wherein the instructions, when executed by the at least one processor, cause the foldable electronic device to:
   while the foldable electronic device is operated in a folded state, control the at least one switch so as to turn off the first display and to turn on the second camera; and
   display a preview image obtained using the second camera on the second display.

8. The foldable electronic device of claim 1,
   wherein the instructions, when executed by the at least one processor, cause the foldable electronic device to:
   while the foldable electronic device is operated in an unfolded state, turn on the first display and turn off the second camera, by using the at least one switch; and
   display a preview image obtained using the first camera on the first display.

9. The foldable electronic device of claim 1, wherein the at least one switch includes a first switch and a second switch, and
wherein the foldable electronic device further comprises:
a first circuit board on which the at least one processor and the first switch are disposed;
a second circuit board on which the second switch is disposed; and
a flexible printed circuit board (FPCB) operatively connecting the first switch and the second switch.

10. The foldable electronic device of claim 1, further comprising:
a sensor,
wherein the instructions are further executable by the at least one processor to cause the foldable electronic device to:
while receiving a preview image via the camera, detect the operating state of the foldable electronic device via the sensor.

11. The foldable electronic device of claim 1, wherein the at least one switch includes a mobile industry processor interface (MIPI) switch.

12. A method in a foldable electronic device including a housing including a first housing structure and a second housing structure, a first display disposed on the first housing structure and the second housing structure and facing a first direction, a second display disposed on the first housing structure and facing a second direction opposite to the first direction, a first camera disposed on the second housing structure and facing the first direction, a second camera disposed on the first housing structure and facing the second direction, a sensor and at least one processor, the method comprising:
obtaining, via the sensor, information indicating an operating state of the foldable electronic device;
detecting, via the at least one processor, the operating state of the foldable electronic device using the obtained information;
when the information indicates that the operating state of the foldable electronic device is an unfolded state, turning on the first display and the first camera; and
when the information indicates that the operating state of the foldable electronic device is a folded state, turning on the second display and the second camera.

13. The method of claim 12, further including:
when the information indicates that the operating state of the foldable electronic device is the unfolded state, turning off the second display and the second camera; and when the information indicates that the operating state of the foldable electronic device is the folded state, turning off the first display and the first camera.

14. The method of claim 13, wherein the turning off of the second camera and the turning on of the first display when it is identified that the operating state of the foldable electronic device is changed from the folded state to the unfolded state includes:
sequentially turning off the first display after the second camera is turned off.

15. The method of claim 13, wherein a first transmission path is a transmission path between the at least one processor, the switch, and the turned on display, and
wherein a second transmission path is a transmission path between the at least one processor, the turned on camera.

16. The method of claim 12,
further comprising:
when the foldable electronic device operates in the folded state, connecting the at least one processor to the second camera; and
displaying a preview image obtained by using the second camera on the second display.

17. The method of claim 16, further comprising:
when the foldable electronic device operates in the unfolded state, connecting the at least one processor to the first display; and
displaying a preview image obtained by using a first camera on the first display.

18. The foldable electronic device of claim 1, wherein the instructions are further executable by the at least one processor to cause the foldable electronic device to:
when the signal indicates that the operating state of the foldable electronic device is an unfolded state, control the at least one switch to turn on the first display and the first camera and turn off the second display and the second camera.

19. The foldable electronic device of claim 1, wherein the instructions are further executable by the at least one processor to cause the foldable electronic device to:
when the signal indicates that the operating state of the foldable electronic device is a folded state, control the at least one switch to turn on the second display and the second camera and turn off the first display and the first camera.

* * * * *